United States Patent
Swinderman et al.

(10) Patent No.: US 7,472,784 B2
(45) Date of Patent: Jan. 6, 2009

(54) CONVEYOR BELT CLEANER SCRAPER BLADE WITH SENSOR AND CONTROL SYSTEM THEREFOR

(75) Inventors: R. Todd Swinderman, Kewanee, IL (US); Andrew J. Waters, Kewanee, IL (US); Pablo F. Perez, Kewanee, IL (US); Phillip E. Dietsch, Galva, IL (US)

(73) Assignee: Martin Engineering Company, Neponset, IL (US)

( * ) Notice: Subject to any disclaimer, the term of this patent is extended or adjusted under 35 U.S.C. 154(b) by 151 days.

(21) Appl. No.: 11/535,659

(22) Filed: Sep. 27, 2006

(65) Prior Publication Data

US 2007/0029169 A1    Feb. 8, 2007

Related U.S. Application Data

(60) Division of application No. 11/224,626, filed on Sep. 12, 2005, now Pat. No. 7,131,525, which is a division of application No. 10/435,899, filed on May 12, 2003, now Pat. No. 6,986,418, which is a continuation-in-part of application No. 10/025,091, filed on Dec. 19, 2001, now Pat. No. 6,591,969, which is a continuation-in-part of application No. 09/454,856, filed on Dec. 7, 1999, now Pat. No. 6,374,990.

(60) Provisional application No. 60/111,774, filed on Dec. 10, 1998.

(51) Int. Cl.
*B65G 45/12* (2006.01)
(52) U.S. Cl. .................. 198/499; 198/497; 198/502.2; 198/812
(58) Field of Classification Search ............ 198/499, 198/812, 497, 502.2
See application file for complete search history.

(56) References Cited

U.S. PATENT DOCUMENTS 2,794,540 A    6/1957  Sinden (Continued)

FOREIGN PATENT DOCUMENTS

DE    4106425 A1 *  8/1992

(Continued)

OTHER PUBLICATIONS

English Abstract of JP62215416, Aug. 22, 1987.

(Continued)

*Primary Examiner*—Gene Crawford
*Assistant Examiner*—Kavel P Singh
(74) *Attorney, Agent, or Firm*—Thompson Coburn LLP

(57) ABSTRACT

A conveyor belt cleaner scraper blade for cleaning the surface of a conveyor belt and a method of manufacture of the scraper blade. The scraper blade includes a body having a base member adapted to be attached to a cross shaft of a conveyor belt cleaner and a scraping member which extends outwardly from the base member to a scraping tip. The scraper blade includes one or more electrical sensors that are embedded in an insert member. The insert member and the sensors are molded and embedded within the body of the scraper blade. Each of the sensors is adapted to provide an electrical output signal representing a physical condition of the scraper blade sensed by the sensor. A variety of sensor embodiments are described, as well as two embodiments of control and monitoring systems for use in conjunction with the various blade and sensor combinations.

23 Claims, 19 Drawing Sheets

U.S. PATENT DOCUMENTS

| | | | |
|---|---|---|---|
| 3,834,518 A | 9/1974 | Specht et al. | |
| 4,114,429 A | 9/1978 | Clark | |
| 4,182,444 A * | 1/1980 | Fisher | 198/499 |
| 4,465,362 A | 8/1984 | Tohma et al. | |
| 4,501,486 A | 2/1985 | Landa | |
| 4,598,823 A | 7/1986 | Swinderman | |
| 4,633,999 A | 1/1987 | Perneczky | |
| 4,643,293 A | 2/1987 | Swinderman | |
| 4,696,389 A | 9/1987 | Schwarze | |
| 4,768,645 A | 9/1988 | Farris | |
| 4,819,026 A | 4/1989 | Lange et al. | |
| 4,927,003 A | 5/1990 | Swinderman et al. | |
| 5,007,523 A | 4/1991 | Morefield | |
| 5,088,965 A | 2/1992 | Swinderman et al. | |
| 5,278,620 A | 1/1994 | Godlove | |
| 5,301,797 A | 4/1994 | Hollyfield, Jr. et al. | |
| 5,335,777 A | 8/1994 | Murphy et al. | |
| 5,426,485 A | 6/1995 | Fujita et al. | |
| 5,447,076 A | 9/1995 | Ziegler | |
| 5,622,249 A | 4/1997 | Morin | |
| 5,630,165 A * | 5/1997 | Asghar et al. | 710/74 |
| 5,838,245 A | 11/1998 | Murakami et al. | |
| 5,841,078 A | 11/1998 | Miller et al. | |
| 5,845,763 A | 12/1998 | Van Tilburg | |
| 5,850,906 A | 12/1998 | Dean | |
| 5,950,803 A | 9/1999 | Schwarze | |
| 6,041,913 A | 3/2000 | Dolan | |
| 6,076,656 A | 6/2000 | Mat | |
| 6,079,619 A | 6/2000 | Teraura et al. | |
| 6,082,524 A | 7/2000 | Brink | |
| 6,227,350 B1 | 5/2001 | Yoshizako et al. | |
| 6,308,822 B1 | 10/2001 | Moran et al. | |
| 6,374,990 B1 * | 4/2002 | Swinderman | 198/497 |
| 6,457,575 B2 | 10/2002 | Swinderman | |
| 6,591,969 B2 * | 7/2003 | Swinderman et al. | 198/497 |
| 6,843,363 B2 | 1/2005 | Schwarze | |
| 6,986,418 B2 * | 1/2006 | Swinderman et al. | 198/497 |
| 7,051,862 B1 * | 5/2006 | Smith et al. | 198/499 |
| 7,093,706 B2 * | 8/2006 | DeVries et al. | 198/499 |
| 2004/0149544 A1 | 8/2004 | Dal Ferro | |
| 2006/0011452 A1 | 1/2006 | Swinderman et al. | |

FOREIGN PATENT DOCUMENTS

| | | |
|---|---|---|
| DE | 4241665 | 6/1994 |
| EP | 0094021 | 11/1983 |
| EP | 0787669 | 8/1997 |
| EP | 1036749 | 9/2000 |
| JP | 60106710 | 6/1985 |
| JP | 6215416 | 9/1987 |

OTHER PUBLICATIONS

English Abstract of EP0094021, Nov. 16, 1983.
English Abstract of DE4241665, Jun. 9, 1994.

* cited by examiner

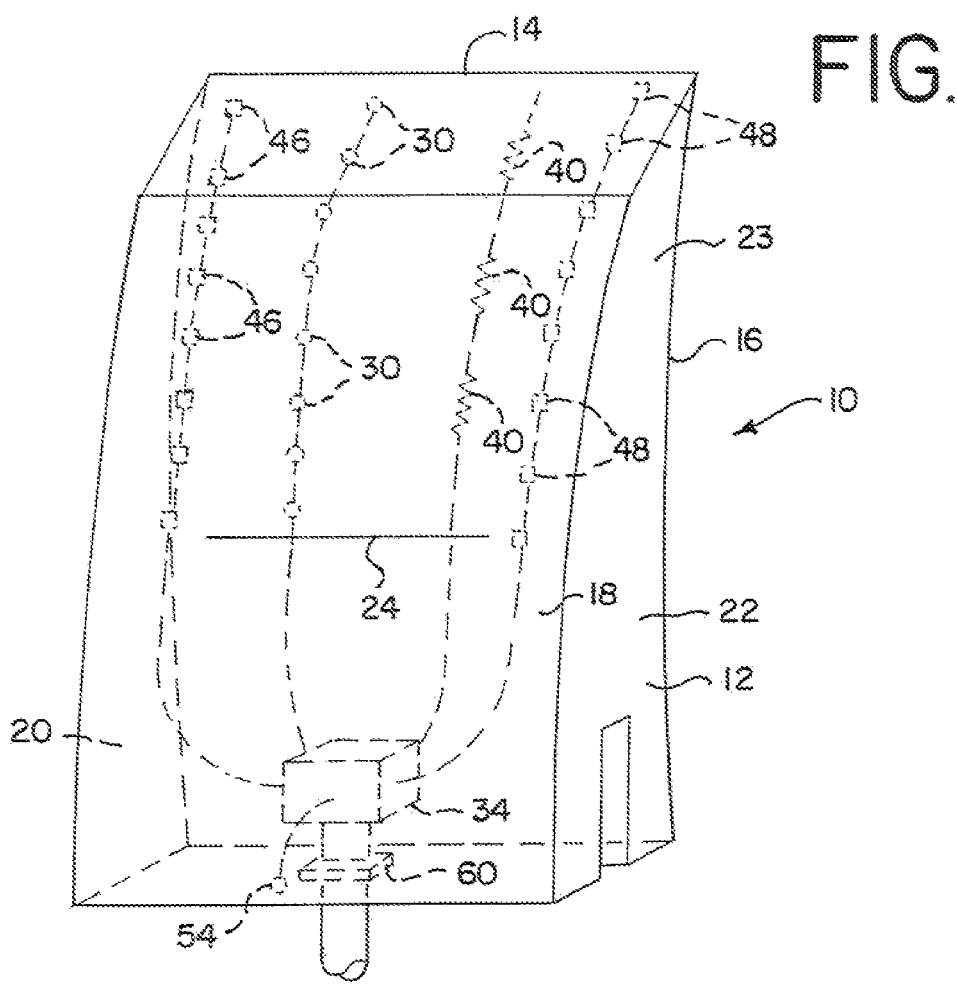
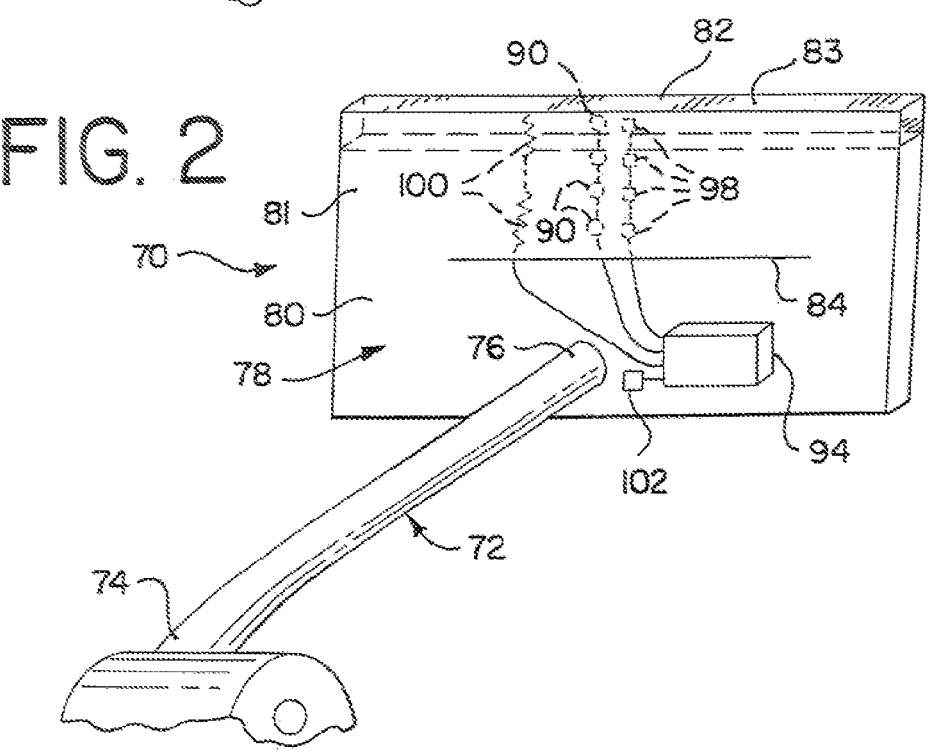

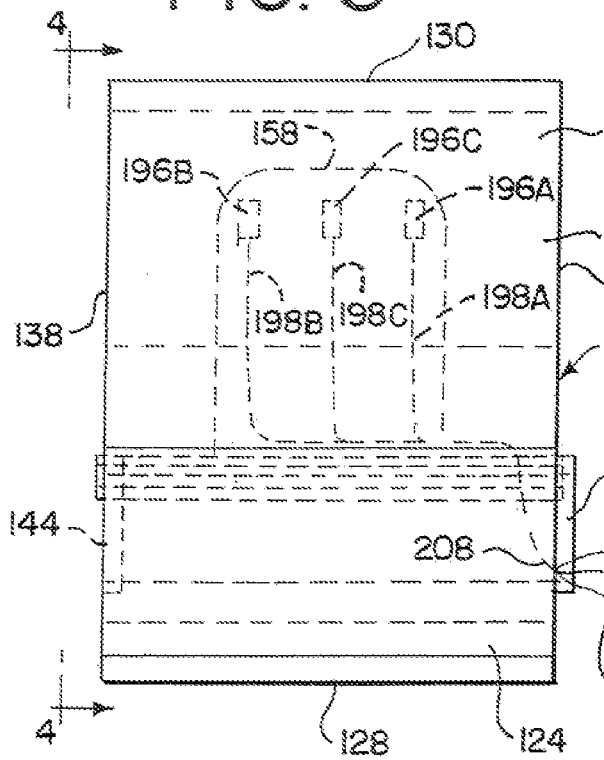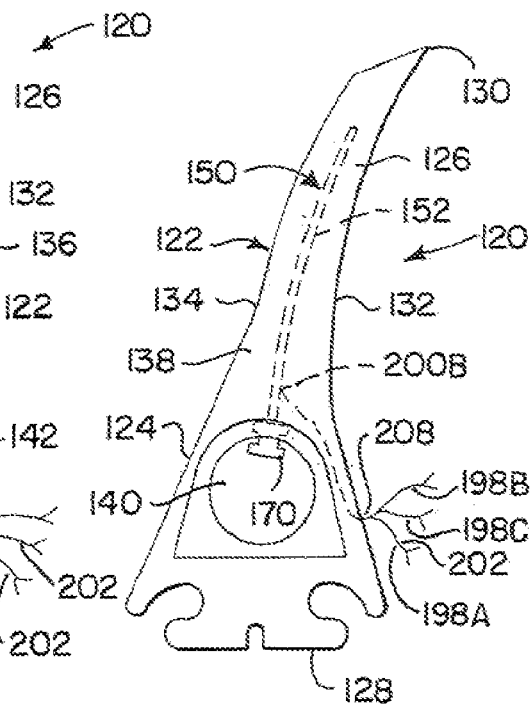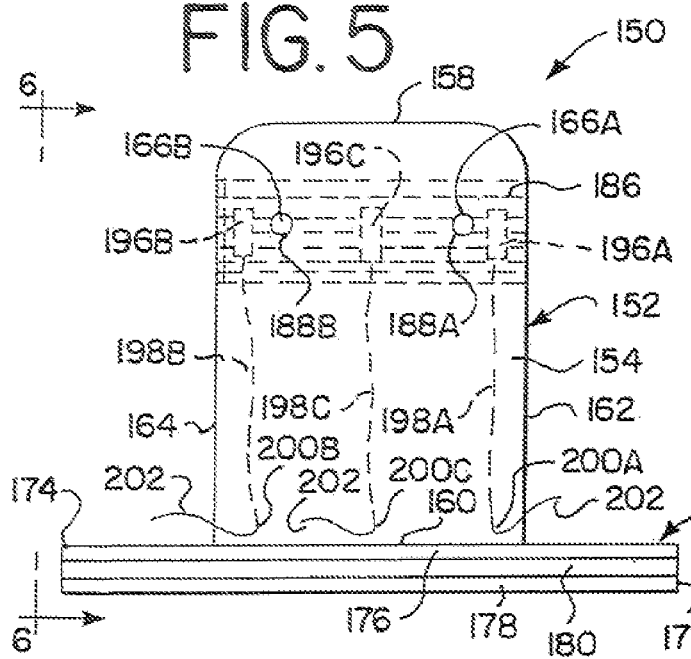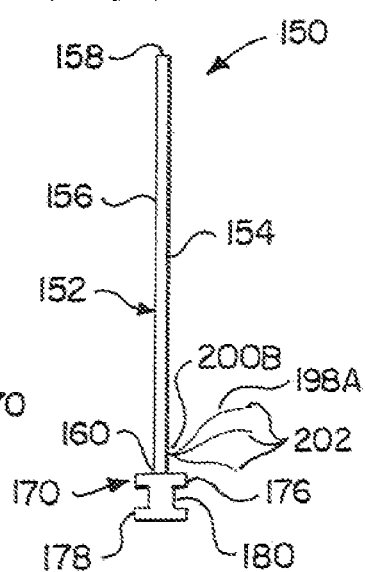

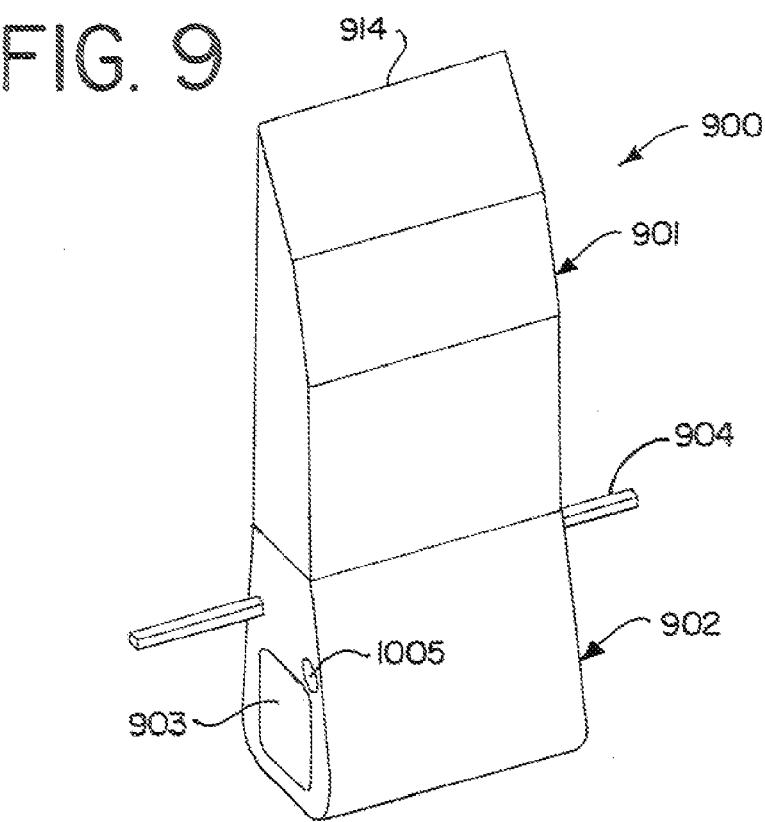
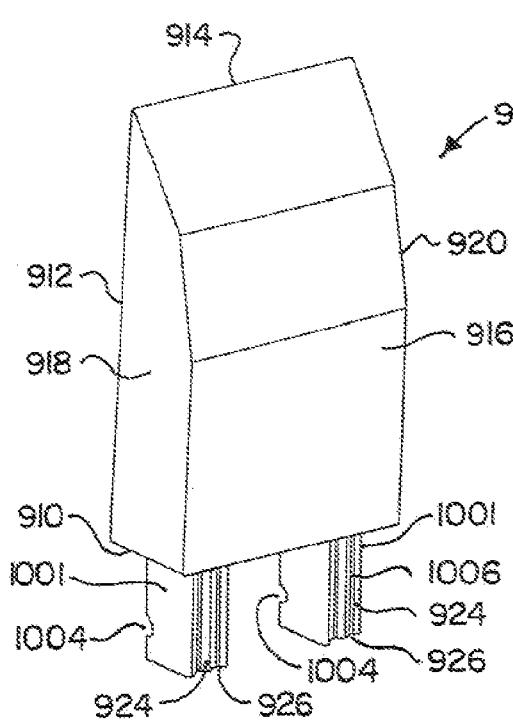
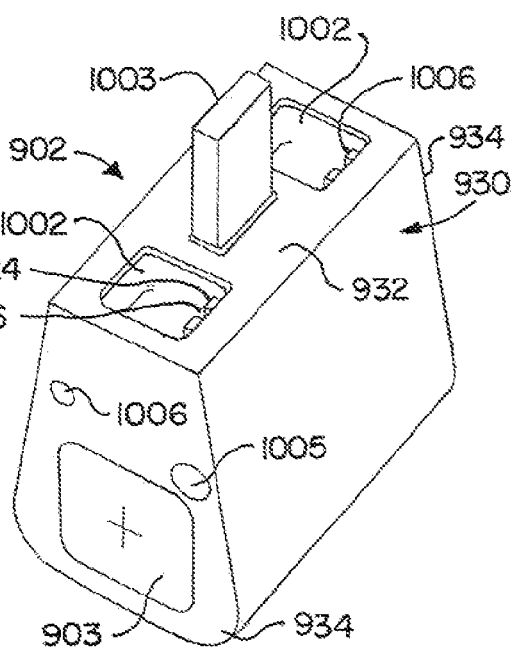

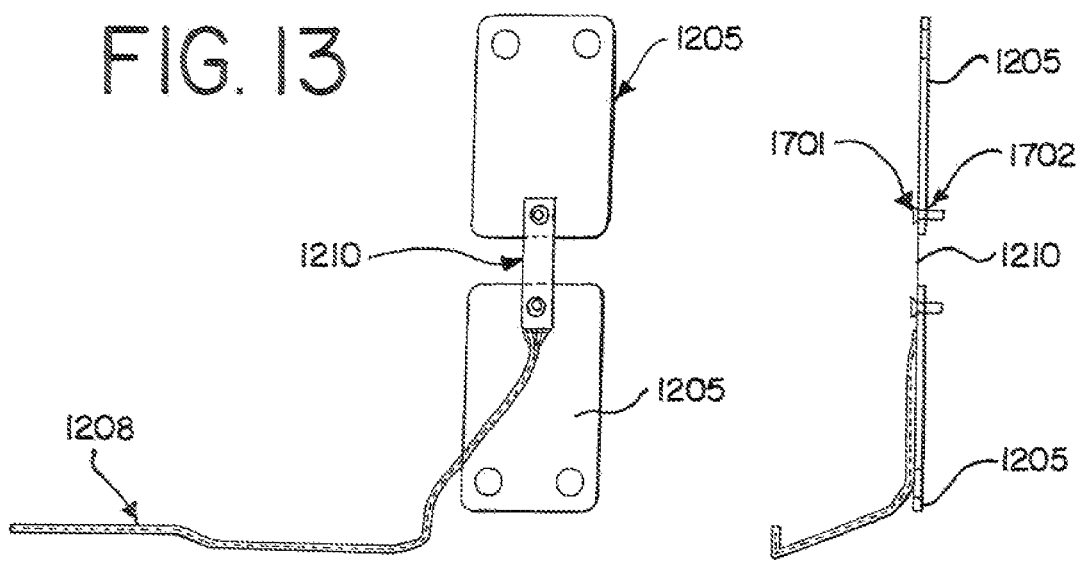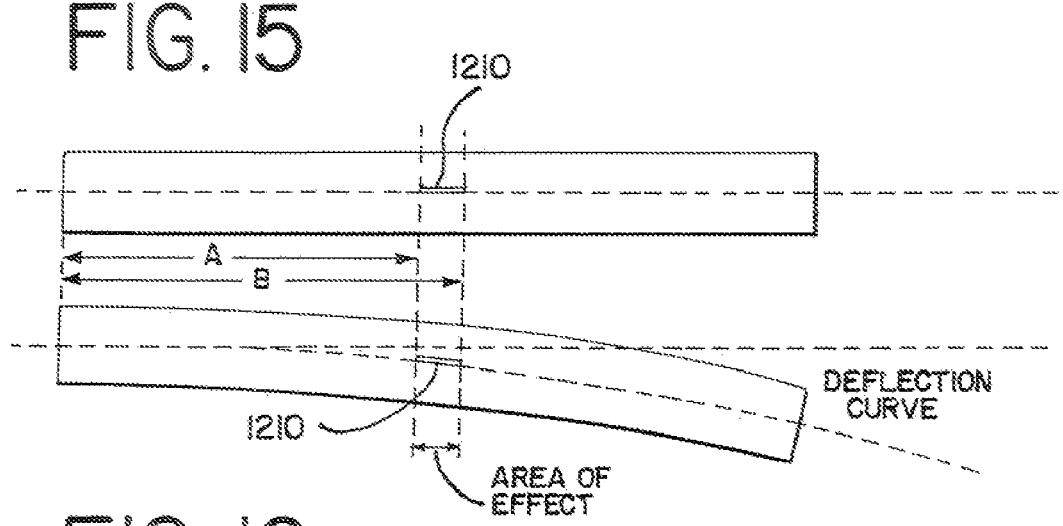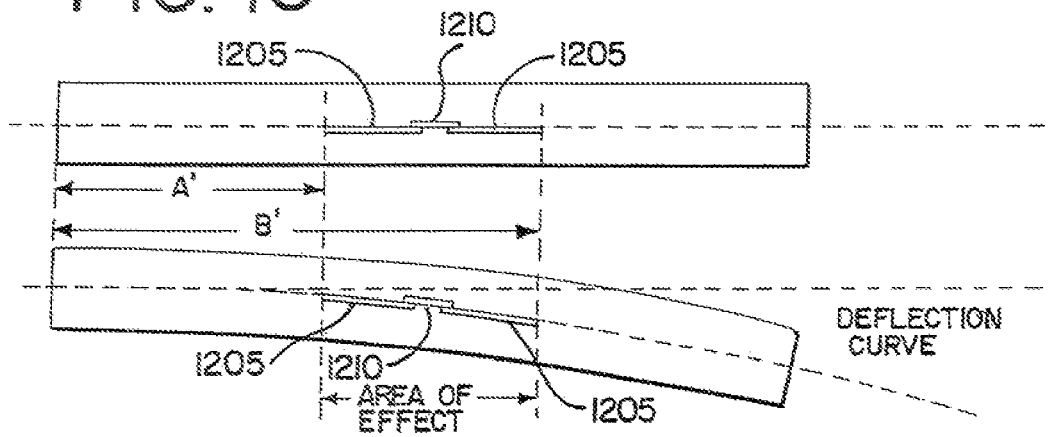

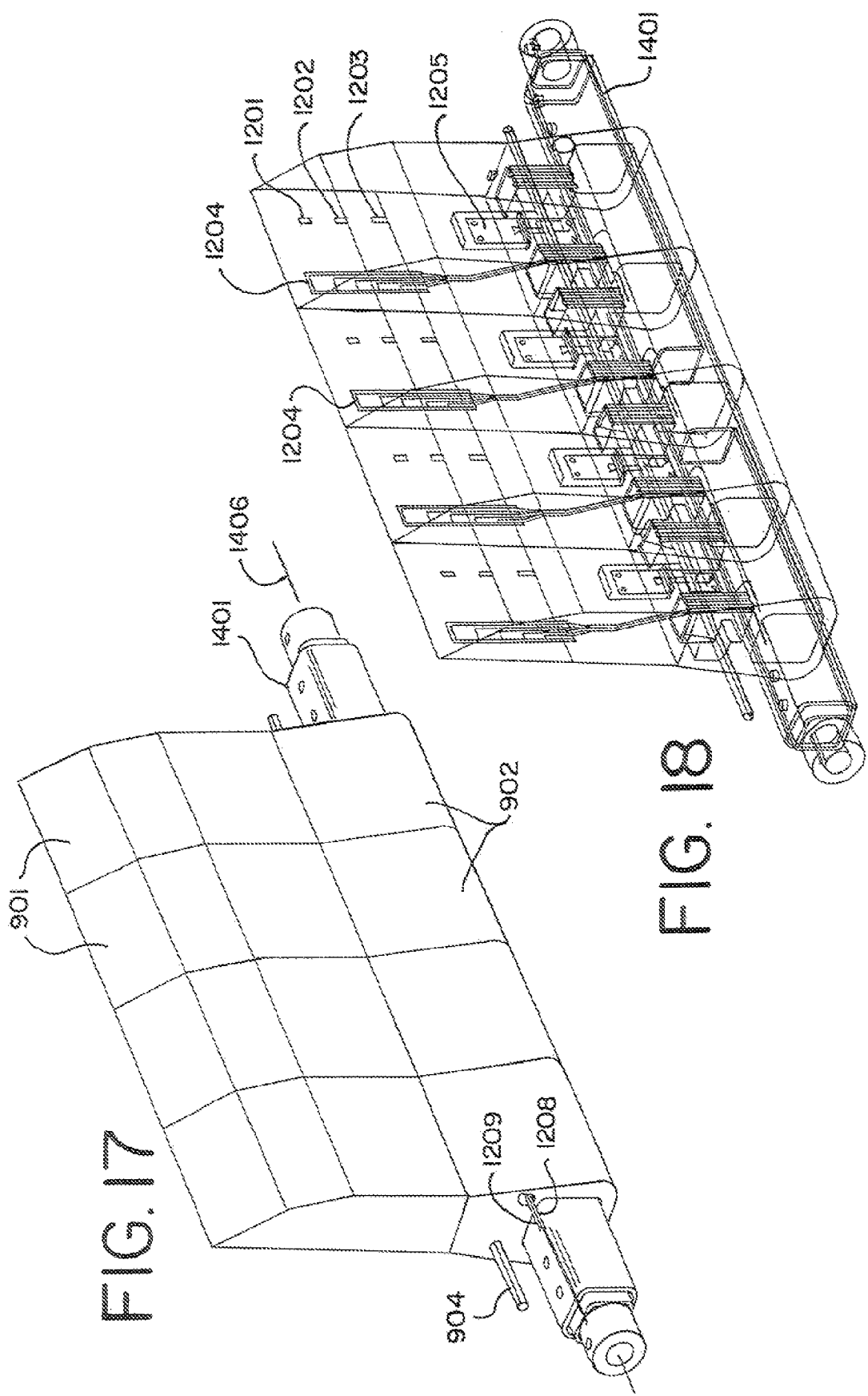

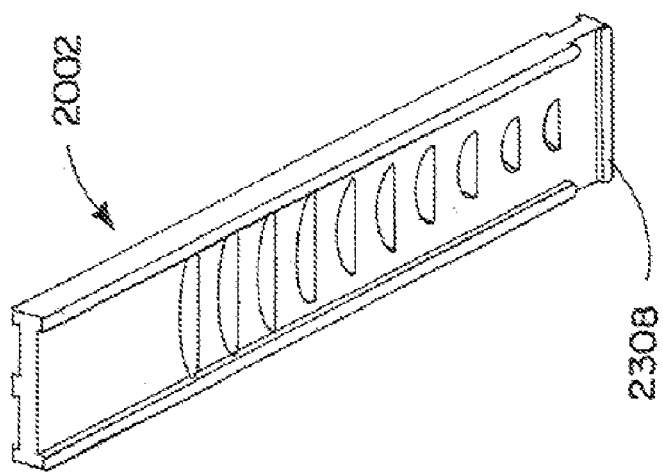
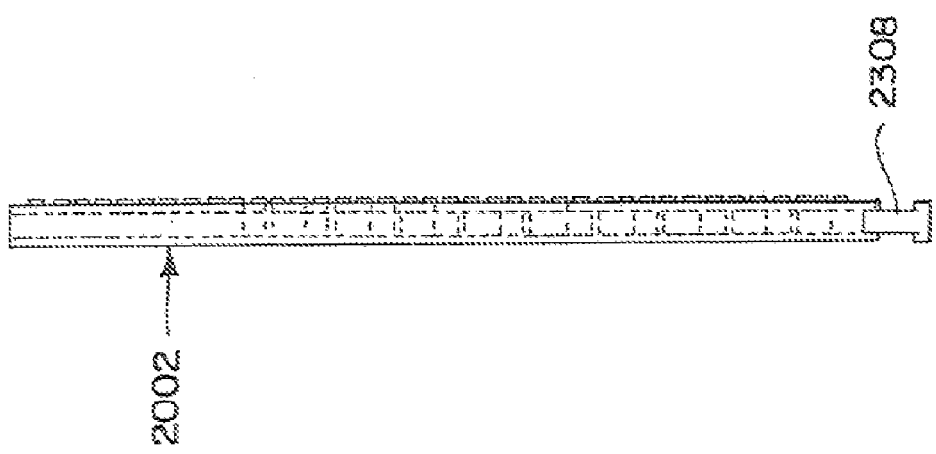
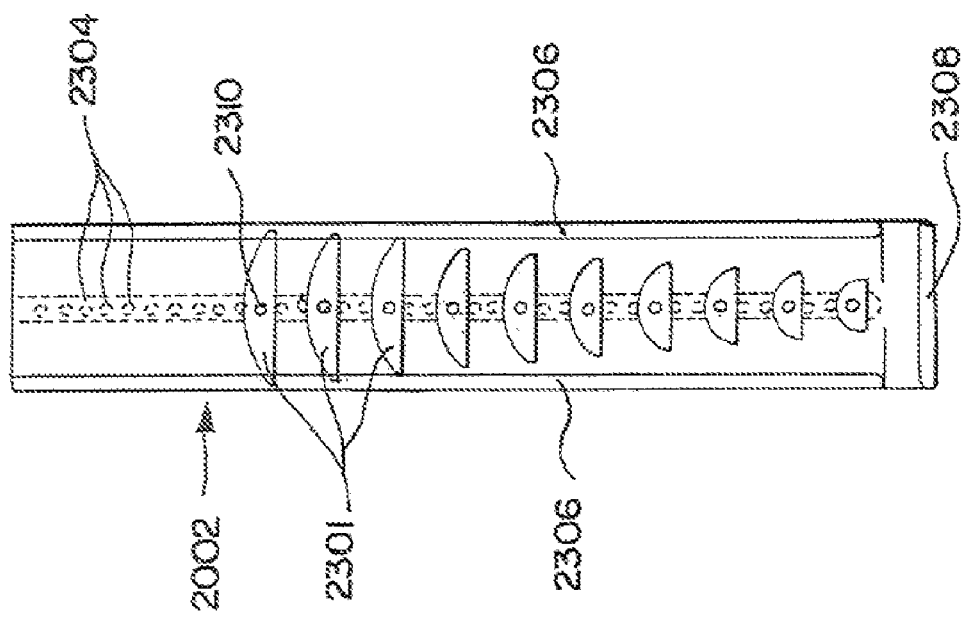
FIG. 23C
FIG. 23B
FIG. 23A

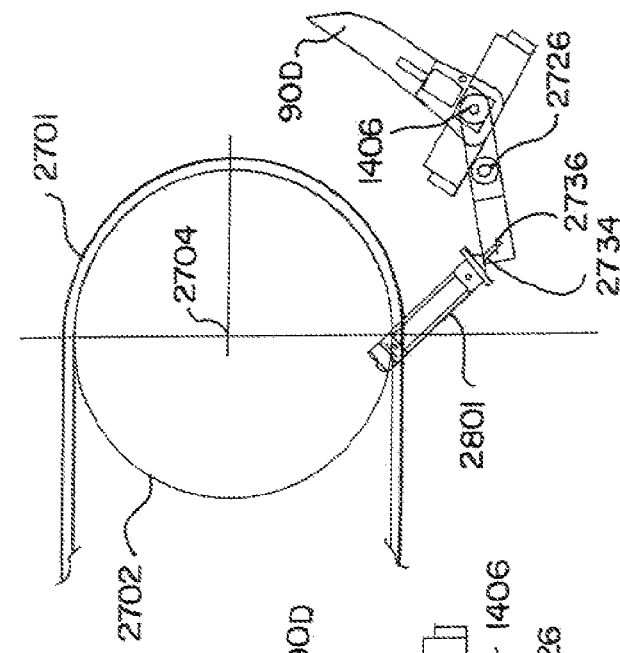
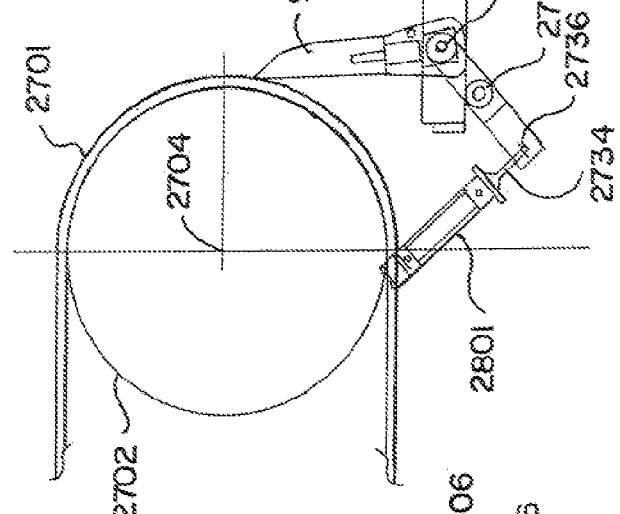
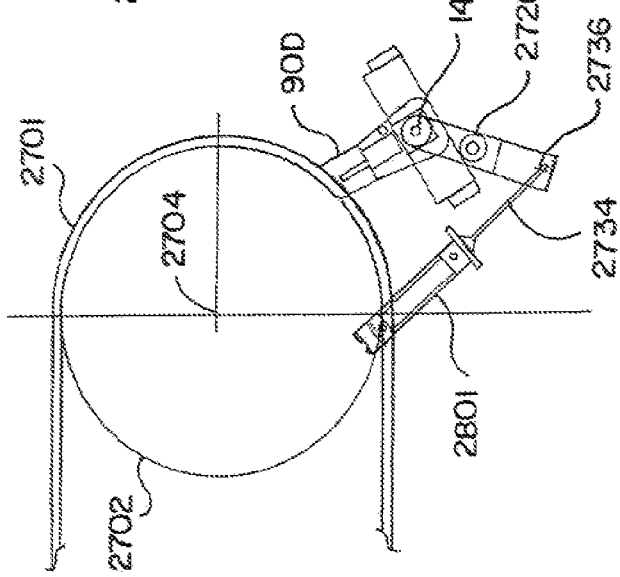

CONVEYOR BELT CLEANER SCRAPER BLADE WITH SENSOR AND CONTROL SYSTEM THEREFOR

RELATED APPLICATIONS

This application is a division of U.S. application Ser. No. 11/224,626, filed Sep. 12, 2005, now pending, which is a division of U.S. application Ser. No. 10/435,899, filed May 12, 2003, now U.S. Pat. No. 6,986,418, which is a continuation-in-part of U.S. application Ser. No. 10/025,091, filed Dec. 19, 2001, now U.S. Pat. No. 6,591,969, which is a continuation-in-part of U.S. application Ser. No. 09/454,856, filed Dec. 7, 1999, now U.S. Pat. No. 6,374,990, which claims the benefit of U.S. Provisional Application No. 60/111,774, filed Dec. 10, 1998.

BACKGROUND OF THE INVENTION

The present invention is directed to a conveyor belt cleaner scraper blade for scraping adherent material from a conveyor belt, and in particular to a conveyor belt cleaner scraper blade including one or more sensors for monitoring the operating conditions of the scraper blade and control system therefore.

Some conveyor mechanisms utilize a moving conveyor belt to transport sand, gravel, coal and other bulk materials, from one location to another. As the bulk material is discharged from the conveyor belt, a portion of the material often remains adhered to the belt. Conveyor belt cleaners, including one or more scraper blades, are used to scrape the adherent material from the belt and thereby clean the belt. A primary conveyor belt cleaner may be placed in scraping engagement with the conveyor belt at the head pulley of the conveyor and a secondary conveyor belt cleaner may be placed in scraping engagement with and below the return run of the conveyor belt a short distance behind the primary conveyor belt cleaner. The scraper blades of a conveyor belt cleaner are removably attached to a rotatable or linearly adjustable cross shaft that extends transversely across the width of the conveyor belt. A tensioning device is attached to one or both ends of the cross shaft. The tensioning device applies a rotational or linear biasing force to the cross shaft which in turn moves the scraper blades into scraping engagement with the conveyor belt with a desired amount of force. During operation, the scraping edge of each scraper blade wears due to its scraping engagement with the rotating conveyor belt. The tensioner rotates or linearly adjusts the cross shaft and the scraper blades to maintain the scraper blades in biased scraping engagement with the conveyor belt.

In order to obtain optimum performance from the scraper blades of a conveyor belt cleaner, it is preferable that the scraper blades be biased into scraping engagement with the conveyor belt with a predetermined amount of force. If the scraper blades are biased against the conveyor belt with an excessive amount of force, this will result in excessive wear to the scraper blades, potential damage to the conveyor belt, and may cause the tip of the scraper blade to develop an excessively high temperature due to the friction generated between the scraper blade and the rotating conveyor belt. If the scraper blades are biased against the conveyor belt with too small of a force, the scraper blades may not effectively clean the conveyor belt. In addition, the scraping tip of the scraper blades may vibrate or chatter against the conveyor belt depending upon the amount of force with which the scraper blades are biased into engagement with the conveyor belt, thereby potentially damaging the scraper blades and/or the belt, and decreasing cleaning efficiency. It is therefore useful to monitor the conditions and parameters of a scraper blade during operation, such as the scraping tip temperature, the rate of wear of the scraper blade, and the magnitude of the force with which the scraper blade is biased into scraping engagement with the conveyor belt, to optimize the performance of the scraper blade. All of these parameters are subject to change depending on a number of factors including conveyor belt speed and the type of material being conveyed.

In addition, a control and monitoring system for the various sensors included in the blade structure would maximize the utility of such a sensor array. Even with a variety of sensors present, the user still must perform periodic inspections of the installation in order to determine whether the blades are excessively worn, and to check for proper engagement force between the belt and the scraper blade assembly. Consequently, a need arises for an economically yet durably constructed system that is capable of alerting the user to various operating conditions that may adversely affect the installation, thus avoiding the need for frequent on-site inspections. Such a control system should also be able to automatically adjust the engagement force between the scraper blades and the belt.

SUMMARY OF THE INVENTION

A conveyor belt cleaner scraper blade for cleaning the surface of a conveyor belt. The scraper blade includes a base member adapted to be attached to the cross shaft of a conveyor belt cleaner and a tip member that extends outwardly from the base member to a scraping edge which is adapted to engage the conveyor belt. The tip member of the scraper blade includes one or more electrical sensors such as temperature sensors, strain detection sensors and/or wear sensors. Each temperature sensor provides an indication of the temperature of the scraper blade at the location of the temperature sensor. The strain detection sensors provide an indication of the magnitude of the strain the scraper blade is subjected to during scraping engagement with the conveyor belt. The wear rate sensors provide an indication of the location of the scraping edge with respect to the base member as the scraper blade wears away due to its scraping engagement with the rotating conveyor belt and as the scraping edge moves closer to the base member. If other conditions need to be monitored other types of sensors may also be utilized. Ultimately, the information which is sensed by the sensors may be transmitted to a microprocessor that may vary the operating conditions of the conveyor belt cleaner, including the force applied by a conveyor belt cleaner tensioner, or possibly sounding an alarm or other signal when the sensed information deviates from preset ranges.

A two-piece scraper blade assembly is disclosed that enhances removability of the scraper blade tip in the event that replacement becomes necessary, as well as providing a secure mounting mechanism to retain the blade tip in position during normal operation. An alternative sensor arrangement is also presented incorporating a unique strain sensor configuration that provides a larger and more informative signal output than prior installations.

The control and monitoring system presented herein provides an integral part of a fully functional, automatically controlled, belt cleaning system. The system is capable of monitoring and controlling important belt cleaning parameters during conveyor belt operation. A variety of sensors and actuators are utilized to monitor critical geometry, blade performance and conveyed material specifics. The important parameters of belt cleaner operation can be adjusted to optimize belt cleaner performance and blade wear while reducing the damaging effects of the belt cleaner on the conveyor belt. This optimization is based on previous belt cleaner research, bulk material properties and behavior, blade composition materials and their behavior, and the interaction of all of these with the conveyor belt surface.

Control algorithms, with upper and lower bound limits on vibration levels, geometry, and pressure (torque) have been coded into a control software package. These algorithms are based on the relationships described above, and are also being continually modified and improved upon.

A number of unique sensing techniques and structures are utilized to monitor the important functional relationships, although simpler and more elegant means are continually being investigated. The system described herein monitors the presence of material on the conveyor belt; critical geometry (specifically tracking blade length and radial position—blade angle and other important variables are calculated based upon these metrics); air line pressure (which is used to control cross shaft torque—i.e., blade pressure at the conveyor belt surface); and blade vibration (multiple blades are monitored). Embedded sensor techniques are employed because of their reliability, durability, and minimal exposure to extreme environmental conditions. A number of new technologies are used to obtain viable signals, including electrical and mechanical vibration magnification.

The sensors provided in the cleaning blade are specifically arranged to take advantage of the sensing techniques used, and previous research conducted, on the behavior of various polyurethane compounds. The tip and base materials are chosen to give acceptable deflection/stress levels at the sensing element. The interlocking features of the base and tip provide strong electrical signals as well as preventing base/tip separation during cleaner operation. Replaceable/wearable tips have been incorporated in the present invention for functionality, simplicity, and to reduce the cost of replacing relatively expensive blade vibration elements.

BRIEF DESCRIPTION OF THE DRAWING FIGURES

FIG. 1 is a perspective view of a primary scraper blade according to the present invention that is adapted for use in connection with a primary conveyor belt cleaner.

FIG. 2 is a perspective view of a secondary scraper blade according to the present invention that is adapted for use in connection with a secondary conveyor belt cleaner.

FIG. 3 is a front elevational view of another embodiment of a primary conveyor belt cleaner scraper blade according to the present invention.

FIG. 4 is a side elevational view taken along line 4-4 of FIG. 3.

FIG. 5 is a front elevational view of the insert member of the scraper blade of FIG. 3.

FIG. 6 is a side elevational view of the insert member taken along line 6-6 of FIG. 5.

FIG. 9 is a perspective view of an alternative embodiment of a scraper blade in accordance with the present invention.

FIG. 10A illustrates the tip member of the scraper blade of FIG. 9.

FIG. 10B shows the base member of the scraper blade of FIG. 9.

FIG. 13 is a front elevational view of a strain gage sensor and associated signal magnifying plates suitable for use in the present invention.

FIG. 14 is a side elevational view of the strain gage sensor of FIG. 13.

FIG. 15 depicts a single thin beam sensor embedded in a urethane bar with no magnifying plates attached.

FIG. 16 depicts a thin beam sensor embedded in a urethane bar with magnifying plates attached to each end of the sensor.

FIG. 17 is a perspective view of a scraper blade assembly incorporating multiple blades as depicted in FIG. 9.

FIG. 18 is a perspective view depicting interior details of the scraper blade assembly of FIG. 17.

FIG. 23A is a front elevational view of a wear panel mold piece suitable for constructing a wear rate sensor in accordance with one embodiment of the present invention.

FIG. 23B is a side elevational view of the wear panel mold piece of FIG. 22A.

FIG. 23C is a perspective view of the wear panel mold piece of FIG. 22A.

FIG. 28A illustrates relative position of system operational components at blade wear out.

FIG. 28B shows relative position of system operational components during initial system set up.

FIG. 28C illustrates the system operational components at a maintenance position.

DETAILED DESCRIPTION OF THE PREFERRED EMBODIMENTS

Figure 7:
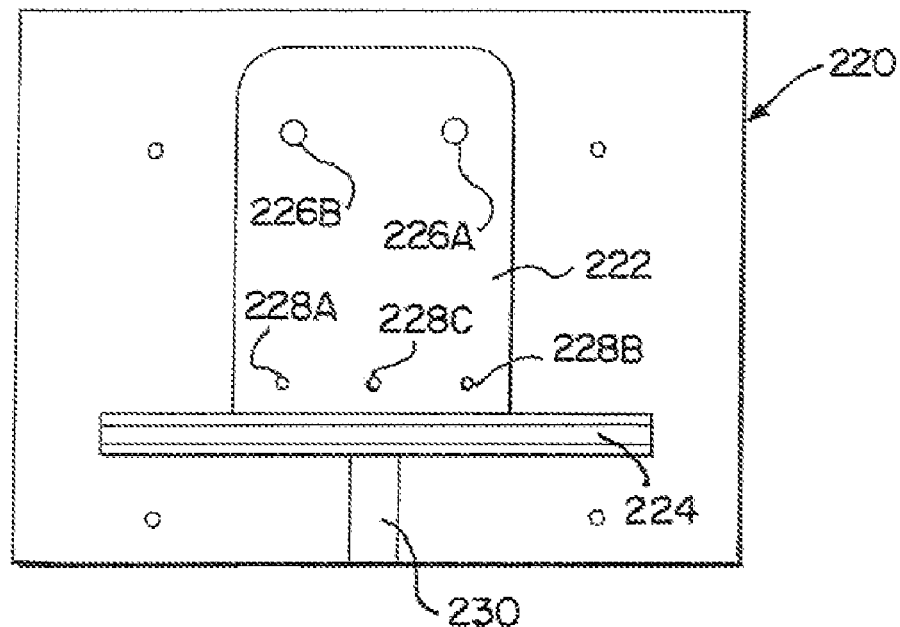
FIG. 7 is a top plan view of an insert mold for the insert member of FIG. 5.

The primary conveyor belt cleaner scraper blade 10 of the present invention, as shown in FIG. 1, is adapted to be removably attached to a cross shaft (not shown) of a conveyor belt cleaner for engagement with the conveyor belt proximate the head pulley such as disclosed in U.S. Pat. No. 4,598,823 of Martin Engineering Company, which is incorporated herein by reference. One or more scraper blades 10 may be attached to the cross shaft. A tensioning device, such as disclosed in U.S. Pat. No. 5,088,965 of Martin Engineering Company, which is incorporated herein by reference, is attached to the end of the cross shaft and is adapted to provide selective conjoint movement (either rotational or linear) of the cross shaft and of the scraper blades 10 to move each scraper blade 10 into biased scraping engagement with the conveyor belt with a scraping force.

The scraper blade 10 includes a base member 12 that is adapted to be removably attached to the cross shaft in any of a number of ways known to one of ordinary skill in the art and a scraping tip 14 that is adapted to engage the conveyor belt. The scraper blade 10 also includes an inner surface 16 that extends from a first bottom edge of the base 12 to the tip 14 and an outer surface 18 that extends from a second bottom edge of the base 12 to the tip 14. The inner and outer surfaces 16 and 18 extend between a first side wall 20 and a second side wall 22. The inner and outer surfaces 16 and 18 may each include one or more curved and/or planar surface portions. The scraper blade 10 includes a wear section 23 that extends between the inner surface 16 and the outer surface 18 and that extends from the base 12 to the tip 14. The wear section 23 of the conveyor belt scraper blade 10 is adapted to wear during use such that the scraping tip 14 as shown in FIG. 1 is eventually located approximately at the bottom end of the wear section 23. A wear line 24 is located on the outer surface 18 adjacent the bottom end of the wear section 23. When the scraping tip 14 of the worn scraper blade 10 is located approximately at the wear line 24, such that the wear section 23 is substantially worn away, the scraper blade 10 should be replaced. The scraper blade 10 is preferably formed from an elastomeric material such as urethane or rubber.

As shown in FIG. 1, the scraper blade 10 includes one or more electrical temperature sensors 30 that are embedded within the wear section 23 of the scraper blade 10, or that are attached to the outer surface 18 of the scraper blade 10. One type of temperature sensor that may be used is Model LM 335 from National Semiconductors. The temperature sensors 30 are located along the length of the wear section 23 from the scraping tip 14 to approximately the wear line 24. Each temperature sensor 30 is electrically connected to a microprocessor 34 which may be located in the base 12 as illustrated in FIG. 1, or located elsewhere, and electrically connected to the sensor. One type of microprocessor that may be used is Model 68 HC11 microcontroller from Motorola. The microprocessor 34 may include a battery to operate the microprocessor 34 and data storage means for collecting and storing data. The temperature sensors 30 are adapted to measure the temperature of the scraper blade 10 at locations located along the length of the wear section 23, including the scraping tip 14 of the scraper blade 10. Each temperature sensor 30 transmits an electrical signal corresponding to the temperature measured by it to the microprocessor 34. The temperature sensors 30 may comprise thermocouples.

The scraper blade 10 also includes one or more electrical strain detection sensors 40 such as strain gage sensors. The strain detection sensors 40 may be embedded within the wear section 23, or attached to the outer surface 18 of the scraper blade 10. The strain detection sensors 40 are located along the length of the wear section 23 from the tip 14 of the scraper blade 10 to approximately the wear line 24. As the scraper blade 10 is preferably made of an elastomeric material such as urethane or rubber, the wear section 23 of the scraper blade 10 will resiliently flex between the base 12 and the tip 14 in response to the magnitude of the scraping force with which the tip 14 is pressed against the conveyor belt. The strain detection sensors 40 measure the strain of the scraper blade 10 due to the flexure of the scraper blade 10, which corresponds to the magnitude of the scraping force with which the scraper blade 10 is biased against the conveyor belt. The strain detection sensors 40 thereby provide a measurement that corresponds to the magnitude of the scraping force with which the scraper blade 10 engages the conveyor belt. Each strain detection sensor 40 sends an electrical signal corresponding to the measured strain and the corresponding scraping force to the microprocessor 34.

The scraper blade 10 also includes one or more first electrical wear rate sensors 46 and one or more second electrical wear rate sensors 48. The first and second wear rate sensors 46 and 48 are respectively located along the length of the wear section 23 from the tip 14 to the wear line 24 of the scraper blade 10. As shown in FIG. 1, the first wear rate sensors 46 extend along the left edge of the scraper blade 10 and the second wear rate sensors 48 extend along the right edge of the scraper blade 10. The first wear rate sensors 46 and the second wear rate sensors 48 are electrically connected to the microprocessor 34. The wear rate sensors 46 and 48 measure the current location of the scraping tip 14 with respect to a known location on the scraper blade 10, such as the bottom end of the wear section 23 at the wear line 24, as the end of the scraper blade 10 wears during use. Each first and second wear rate sensor 46 and 48 respectively sends an electrical signal to the microprocessor 34 which signals indicate the current position of the scraping tip 14 with respect to the bottom end of the wear section 23 or the top of the base member 12. As the outermost wear rate sensors 46 and 48 are worn away, a signal is no longer received from these sensors thereby indicating that the scraping tip 14 has worn past their location and indicating that the scraping tip 14 is presently located adjacent the outermost wear rate sensors 46 and 48 that are still sending signals to the microprocessor 34. Each wear rate sensor 46 and 48 may be combined with a respective temperature sensor 30 as a single combined sensor. A thermocouple may be used as a combined sensor to indicate both temperature and wear rate.

The scraper blade 10 also includes an ambient air temperature sensor 54 located in the outer surface 18, near the bottom wall of the base 12 of the scraper blade 10, that is adapted to be placed in communication with the surrounding air. The ambient air temperature sensor 54 measures the ambient temperature of the air in the area adjacent to the scraper blade 10. The ambient air temperature sensor 54 is electrically connected to the microprocessor 34 and sends an electrical signal to the microprocessor 34 that corresponds to the measured ambient air temperature. The ambient air temperature measured by the ambient air temperature sensor 54 can be compared to the scraping tip temperature measured by the temperature sensors 30 to determine the temperature differential therebetween, which corresponds to the increase in temperature of the scraping tip 14. The increase in temperature of the scraping tip 14 may be attributable to the friction created between the scraping tip 14 of the scraper blade 10 and the rotating conveyor belt, and/or to the transfer of heat from hot bulk material carried by the conveyor belt to the scraper blade 10.

The microprocessor 34 is electrically connected to an electrical transmitter member 60, such as an electrical connector member, located in the base 12. The electrical transmitter member 60 may be an RS232 serial port or other type of port such as an infrared port or a radio signal port. The electrical transmitter member 60 may be adapted to be attached to a cable that is connected to a computer. The transmitter member 60 transfers data collected by the microprocessor 34 and the sensors to the computer for storage and analysis.

Alternatively, the scraper blade 10 may not include the microprocessor 34, and each of the sensors 30, 40, 46, 48 and 54 may be electrically connected directly to the electrical transmitter member 60, such that the transmitter member 60 will transfer the respective signals generated by the sensors 30, 40, 46, 48 and 54 to a microprocessor located outside of the scraper blade 10 or directly to a computer.

Another embodiment of the conveyor belt cleaner scraper blade of the present invention is shown in FIG. 2 and is designated with reference number 70. The scraper blade 70 is adapted for use in connection with a secondary conveyor belt cleaner, such as described in U.S. Pat. No. 4,643,293 of Martin Engineering Company, which is incorporated herein by reference. The scraper blade 70 includes an arm 72 having a first end 74 that is adapted to be connected to the cross shaft of the conveyor belt cleaner and a second end 76 that is adapted to be connected to a blade 78. The arm 72 and the blade 78 may be respectively formed from an elastomeric material such as urethane or rubber, or may respectively be made of a metal or ceramic material. The blade 78 includes a base member 80 and a wear section 81 having a scraping tip 82. The wear section 81 may include a wear resistant insert 83, formed from a metal such as tungsten carbide, that is connected to the end of the blade 78 to form the scraping tip 82.

The wear section 81 of the scraper blade 70 includes one or more temperature sensors 90 that are located along the length of the wear section 81 from the scraping tip 82 to a wear line 84 located adjacent to the bottom end of the wear section 81. The temperature sensors 90 are electrically connected to a microprocessor 94. The microprocessor 94 may be embedded within the blade 78 or may be adhesively bonded or otherwise attached to an exterior surface of the blade 78 or may be disposed at a remote location. The microprocessor 94 preferably includes one or more batteries for powering the microprocessor 94 and data storage means for collecting and storing data. Each temperature sensor 90 measures the temperature of the wear section 81 of the scraper blade 70 at its respective location, including at the scraping tip 82, and transmits an electrical signal corresponding thereto to the microprocessor 94.

The wear section 81 of the scraper blade 70 also includes one or more wear rate sensors 98 that are electrically connected to the microprocessor 94. The wear rate sensors 98 are located along the length of the wear section 81 from the scraping tip 82 to approximately the wear line 84. The wear rate sensors 98 indicate or measure the location of the scraping tip 82 relative to the bottom end of the wear section 81 at the wear line 84 as the scraping tip 82 wears down through use. Each wear rate sensor 98 transmits an electrical signal to the microprocessor 94 that is used to indicate the current location of the scraping tip 82. Each temperature sensor 90 may also be combined with a respective wear rate sensor 98 as a combined sensor that indicates both temperature and wear rate. Such a combined sensor may comprise a thermocouple.

The scraper blade 70 may also include one or more strain detection sensors 100, such as strain gage sensors, for sensing the amount of strain the blade 78 is subjected to during operation which corresponds to the scraping force with which the blade 78 engages the conveyor belt. Each strain gage sensor 100 transmits an electrical signal corresponding to the magnitude of the measured strain to the microprocessor 94.

The scraper blade 70 includes an electrical transmitter member 102 that is electrically connected to the microprocessor 94. The transmitter member 102 is adapted to be electrically connected to a cable and thereby to a computer. Alternatively, the microprocessor 94 may be eliminated from the scraper blade 70 and the sensors 90, 98 and 100 may be directly connected to the transmitter member 102.

The sensors of the scraper blades 10 and 70 are constructed so as to not wear or groove the conveyor belt. The temperature sensors 30 and 90 measure blade tip temperature, which can indicate whether the conveyor belt is running with or without material, or when the scraper blade is biased into scraping engagement with the conveyor belt with a larger or smaller than desired force. The strain detection sensors 40 and 100 measure strain and large amplitude vibrations or chatter at the scraping tip 14 and 82 of the scraper blades 10 and 70 to indicate the number of hours the scraper blades have been in operation and/or scraper blade chatter. The strain detection sensors 40 and 100 measure and indicate impact forces applied to the scraper blades 10 and 70 which in turn indicates the condition of the surface of the conveyor belt. The strain detection sensors 40 and 100 also indicate the bending or flexural strain in the scraper blades 10 and 70 which corresponds to the force with which the scraper blades are biased into engagement with the conveyor belt. The wear sensors 48 and 98 indicate the remaining useable scraping length of the wear sections 23 and 81 of the scraper blades 10 and 70 and the rate of wear of the wear sections.

The interval at which the microprocessors 34 and 94 acquire data from the sensors may be varied as desired over a practically infinite range of intervals. For example, an interval such as sixty seconds for purposes of research and development could be used and an interval of approximately five minutes could be used for service uses. The data storage capacity of the microprocessors 34 and 94 may also vary over a practically infinite range. For example, a capacity of ninety days of data storage capability for research and development purposes may be used, and a data storage capability of one year for service operations may be used. The microprocessors may store all of the data collected by the sensors for review and analysis at a later date or may be connected to the conveyor drive mechanism and/or tensioning mechanism to automatically vary the speed of the conveyor belt or the tension applied to the scraper blades when the sensed data varies from predetermined ranges. Alternatively, the microprocessor may be connected to sound an alarm or activate some other signal when certain conditions are sensed. Also the sensors may be connected to display devices such as gages or digital readout devices to display the conditions being sensed.

FIGS. 3 and 4 show another embodiment of a primary conveyor belt cleaner scraper blade of the present invention identified with the reference number 120. The scraper blade 120 includes a body 122 having a base member 124 and a scraping member 126. The base member 124 includes a generally T-shaped mounting member 128 at its bottom end which is adapted to be removably attached to the cross shaft of a conveyor belt cleaner. The scraping member 126 extends outwardly from the upper end of the base member 124 to a scraping tip 130. The scraping member 126 includes the wear section of the scraper blade 120. The scraper blade 120 includes an inner surface 132 that extends from a first bottom edge of the base member 124 to the scraping tip 130 and an outer surface 134 that extends from a second bottom edge of the base member 124 to the scraping tip 130. The inner and outer surfaces 132 and 134 of the scraper blade 120 may each include one or more curved and/or planar surface portions. The inner and outer surfaces 132 and 134 extend laterally between a first side wall 136 and a second side wall 138.

A generally cylindrical bore 140 extends through the base member 124 from the first side wall 136 to the second side wall 138. A projection 142 extends outwardly from the first side wall 136 at the base member 124. A recess 144 is located in the second side wall 138 at the base member 124. The bore 140 extends through the projection 142 and recess 144. The projection 142 is adapted to be located within and interlock with a recess in an adjacent scraper blade 120, and the recess 144 is adapted to receive and interlock with a projection from another adjacent scraper blade 120, such that the base members 124 of adjacent scraper blades interlock with one another. The body 122 of the scraper blade 120 is preferably formed from an elastomeric material such as urethane or rubber. If desired, the scraping member 126 may include a wear resistant scraping element at the scraping tip 130 which is adapted to engage the conveyor belt. The wear resistant scraping element may be made from a wear-resistant material such as tungsten carbide or a ceramic.

The scraper blade 120 includes an insert member 150 as best shown in FIGS. 5 and 6. The insert member 150 includes a generally plate-like member 152 having a first surface 154 and a second surface 156 which is generally uniformly spaced apart from the first surface 154. The plate-like member 152 includes a generally linear top edge 158, and a generally linear bottom edge 160 which is spaced apart from and generally parallel to the top edge 158. A generally linear side edge 162 extends between and is generally perpendicular to the top and bottom edges 158 and 160. A generally linear side edge 164 extends between and is generally perpendicular to the top and bottom edges 158 and 160. The side edge 164 is spaced apart from and generally parallel to the side edge 162. The corners between the top edge 158 and the side edges 162 and 164 may be curved or rounded. One or more mounting holes 166A-B extend through the plate-like member 152 from the first surface 154 to the second surface 156. The mounting holes 166A-B are spaced apart from one another and are located a generally uniform distance from the top edge 158 of the plate-like member 152. The mounting holes 166A-B are also each located a generally uniform distance from a side edge 162 and 164.

The insert member 150 also includes a mounting member 170 attached to the bottom edge 160 of the plate-like member 152. The mounting member 170 extends generally linearly between a first end 172 and a second end 174. The ends 172 and 174 are located outwardly beyond the side edges 162 and 164 of the plate-like member 152. As best shown in FIG. 6, the mounting member 170 is generally I-shaped in cross section. The mounting member includes an upper flange 176, a lower flange 178 and web 180 which extends generally perpendicularly between the upper and lower flanges 176 and 178. An elongate generally rectangular channel is located between the upper and lower flanges 176 and 178 on each side of the web 180. The lower flange 178 and the web 180 form an elongate generally T-shaped mounting member. The insert member 150 is preferably formed from an elastomeric material such as urethane or rubber.

A mesh sheet 186 is embedded and molded within the plate-like member 152 of the insert member 150 adjacent the top edge 158. The mesh sheet 186 is located between the surfaces 154 and 156 and extends from a position adjacent the side edge 162 to a position adjacent the side edge 164. The mesh sheet 186 includes a plurality of apertures. The mesh sheet 186 also includes one or more mounting holes 188A-B which extend through the mesh sheet 186 and which are adapted to align with respective mounting holes 166A-B in the plate-like member 152. The mesh sheet 186 is generally planar and flexible. A preferred mesh sheet 186 is formed from fiberglass fibers extending longitudinally and transversely in a rectangular grid and spaced apart from one another at a center to center distance of approximately two millimeters. A preferred mesh sheet 186 is commonly available dry wall patching material.

The scraper blade 120 includes one or more electrical sensors 196A-C coupled to a surface of the mesh sheet 186 and which are thereby coupled to the plate-like member 152 of the insert member 150. The electrical sensors 196A-C are preferably molded and embedded within the plate-like member 152 between the surfaces 154 and 156. The top ends of the sensors 196A-C are preferably located approximately three-quarters of an inch from the top edge 158 of the plate-like member 152. Although the insert member 150 is shown as including three sensors 196A-C, the insert member 150 may include only one sensor, two sensors or more than three sensors. The sensors 196A and 196B may be electrical strain detection sensors such as strain gage sensors and may be of the uniaxial pattern type of sensor. One type of strain detection sensor that may be used is Part Number CEA-06-250UW-120 of Measurements Group, Inc. of Raleigh, N.C. The electrical sensor 196C may be an electrical temperature sensor. One type of temperature sensor that may be used is Part Number ETG-50B of Measurements Group, Inc. of Raleigh, N.C. One or more of the sensors may be a wear rate sensor. Each electrical sensor 196A-C is electrically connected to an end of a respective lead wire 198A-C. Each lead wire 198A-C is embedded within the plate-like member 152 from the end which is connected to an electrical sensor 196A-C to a respective exit location 200A-C where the lead wires 198A-C extend outwardly from the plate-like member 152 to terminal ends 202 of the lead wires. The terminal end 202 of each lead wire 198A-C may be electrically connected to an electrical connector member and thereby to a microprocessor, computer or the like. Each lead wire 198A-C includes at least two electrical wires.

As best shown in FIGS. 3 and 4, the insert member 150 is molded and embedded within the body 122 of the scraper blade 120. The plate-like member 152 is embedded within the scraping member 126 and within the base member 124 between the inner surface 132 and outer surface 134 of the body 122. The plate-like member 152 is generally centrally located in the body 122 between and spaced apart from the side walls 136 and 138 as shown in FIG. 3. The mounting member 170 of the insert member 150 extends across the width of the body 122 from the side wall 136 to the side wall 138. The lower flange 178 and the web 180 of the mounting member 170 extend into the bore 140 of the body 122. The lead wires 198A-C extend from the exit locations 200A-C of the plate-like member 150 through the body 122 to an exit location 208. The lead wires 198A-C extend outwardly from the body 122 from the exit location 208 to the respective terminal ends 202 of the lead wires. The strain detection sensors 196A-B measure the strain of the scraper blade 120 due to the flexure of the scraper blade 120, which corresponds to the magnitude of the scraping force with which the scraper blade 120 is biased against the conveyor belt. The strain detection sensors 196A-B each provide a measurement that corresponds to the magnitude of the scraping force with which the scraper blade 120 engages the conveyor belt. Each strain detection sensor 198A-B transmits an electrical signal corresponding to the measured strain and the corresponding scraping force to a microprocessor, computer, or other data storage or analysis device. The temperature sensor 198C measures the temperature of the scraper blade 120 and transmits an electrical signal corresponding to the measured temperature to a microprocessor, computer or other data storage or analysis device. The electrical sensors 196A-C operate in the same manner as the electrical sensors 30, 40, 46, 48 and 54. The lead wires 198A-C may comprise computer communication wire as commonly used in connection with hard drives and CD-ROM drives in computers, with all but two strands of the lead wire removed.

The scraper blade 120 is made by cutting the mesh sheet 186 to a width of approximately two inches and a length of approximately four inches. The mesh sheet 186 is then placed over a positioning guide (not shown) including indicia which provide the location of each of the electrical sensors 196A-C and of the mounting holes 188A-B. The positioning guide may comprise a sheet of paper with locating indicia marked thereon. The electrical sensors 196A-C are then placed on the surface of the mesh sheet 186 in their respective locations as indicated by the locating indicia on the positioning guide. The electrical sensors 196A-C are then coupled to the mesh sheet 186 by adhesive tape or other types of adhesive. The lead wires 198A-C are electrically connected to respective electrical sensors 196A-C by soldering or the like. The mounting holes 188A-B are then made in the mesh sheet 186 with a hole punch in locations as indicated by the locating indicia on the positioning guide. Each end of the mesh sheet 186 is then trimmed such that the mesh sheet 186 has an overall length of approximately three inches.

The mesh sheet 186 and the electrical sensors 196A-C are then placed in an insert mold 220 as shown in FIG. 7. The insert mold 220 includes a recess 222 adapted to form the plate-like member 152 of the insert member 150 and a recess 224 adapted to form the mounting member 170 of the insert member 150. The insert mold 220 includes generally cylindrical posts 226A-B located in the recess 222 which extend outwardly from the mold surface. The posts 226A-B are adapted to be inserted through the mounting holes 188A-B of the mesh sheet 186 to properly position the mesh sheet 186 and the electrical sensors 196A-C within the recess 222. The mesh sheet 186 is a positioning member for positioning the sensors 196A-C within the insert member 150 and ultimately within the body 120 in a desired location. The insert mold 220 also includes apertures 228A-C which are located at positions corresponding to the exit locations 200A-C of the insert member 150. The terminal ends 202 of the lead wires 198A-C are inserted through the apertures 228A-C such that the terminal ends 202 are located outside of the insert mold 220. The mold 220 is closed and molten elastomeric material such as urethane or rubber is poured or injected into the recesses 220 and 224 through a passageway 230 in the mold 220. The molten elastomeric material flows through the apertures in the mesh sheet 186 and adheres to the electrical sensors 196A-C. The elastomeric material is then allowed to cool and solidify. The mesh sheet 186 and electrical sensors 196A-C are thereby molded and embedded within the plate-like member 152 of the insert member 150. The insert member 150 is then removed from the insert mold 220.

Figure 8:
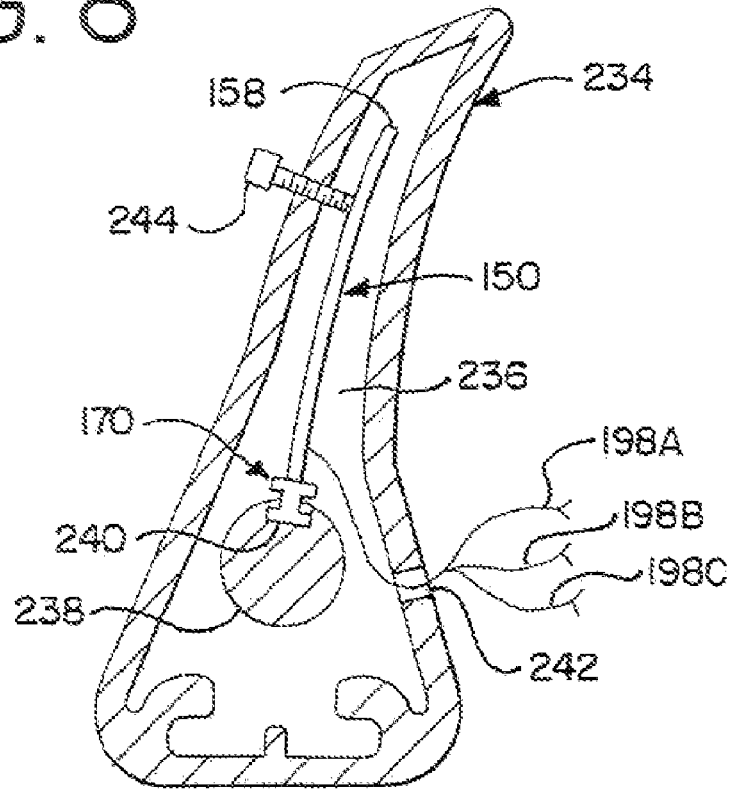
FIG. 8 is a cross sectional view of a body mold for the scraper blade body of FIG. 3 shown with the insert member positioned therein.

The insert member 150 is next inserted into a scraper blade body mold 234 as shown in FIG. 8. The body mold 234 includes a recess 236. The body mold 234 also includes a generally cylindrical shaft 238 located within the recess 236 which is adapted to form the bore 140 in the body 122 of the scraper blade 120. The shaft 238 includes an elongate generally T-shaped slot 240. The T-shaped slot 240 is adapted to slidably receive the lower flange 178 and web 180 of the mounting member 170 of the insert member 150. The mounting member 170 thereby slidably and removably mounts the base or bottom end of the insert member 150 to the shaft 238 in a desired position within the recess 236. The front wall of the body mold 32 includes an aperture or slot 242 through which the terminal ends 202 of the lead wires 198A-C are inserted such that the terminal ends 202 are located outside of the recess 236.

The body mold 234 includes an adjustment member 244 such as a threaded bolt. The adjustment member 244 is threadably attached to the body mold 234 such that the tip of the adjustment member 244 is located within the recess 236 and the head of the adjustment member 244 is located outside of the body mold 234. The adjustment member 244 is selectively rotated to insert or retract the tip of the adjustment member 244 within the recess 236. The tip of the adjustment member 244 engages the plate-like member 152 of the insert member 150 and pivots or bends the plate-like member 150 with respect to the mounting member 170 to thereby locate the plate-like member 152 in a desired location within the recess 236 of the body mold 234. The insert member 150 is a positioning member for positioning the sensors 196A-C within the body 122 of the scraper blade 120 in a desired location. The body mold 234 is closed and molten elastomeric material such as urethane or rubber is then poured or injected into the recess 236 of the body mold 234 to mold the body 122. The molten elastomeric material melts the outer surfaces of the elastomeric material of the plate-like member 152 and of the mounting member 170 of the insert member 150 that come into contact with the molten elastomeric material. The elastomeric material is allowed to cool and solidify. The insert member 150 thereby becomes integrally attached to the body 122. The elastomeric material that forms the body 122 is preferably the same type of urethane or the same type of rubber that is used to form the insert member 150 so that the scraper blade 120 will have uniform mechanical properties. The adjustment member 244 is then retracted from the recess 236. The cast scraper blade 120 is then removed from the body mold 234.

When the scraping tip 130 of the scraper blade 120 is in scraping engagement with a moving conveyor belt, the outer end of the scraping member 126 will wear away such that the location of the scraping tip 130 will move toward the base member 124. When the outer end of the scraping member 126 wears to the position of the sensors 196A-C, the sensors 196A-C will become worn and will eventually stop functioning. The worn scraper blade 120 may be replaced at this time with a new scraper blade. However, if desired, the worn scraper blade 120 can continue to be used for cleaning a conveyor belt as the scraping member 126 can be worn beyond the sensors 196A-C. The sensors 196A-C are designed such that they will not damage the conveyor belt if the sensors engage the moving belt.

FIG. 9 is a perspective view of an alternative embodiment of a scraper blade, generally depicted by the numeral 900, that shows a tip member 901 and a base member 902 in their joined operational configuration. Both the tip 901 and base 902 are preferably formed from a urethane compound, as set forth above in conjunction with the discussion of the previous embodiment, but a number of elastomeric materials of sufficient durability and hardness could also be used. FIGS. 10A and 10B illustrate the tip and base portions, respectively, separated from one another. As shown in FIG. 10A the tip 901 includes a body having a planar bottom wall 910, an inner surface 912 that extends from a first edge of the bottom wall 910 to a scraping tip or edge 914, and an outer surface 916 that extends from a second edge of the bottom wall 910 to the scraping edge 914. The inner and outer surfaces extend laterally between a planar first side wall 918 and a planar second side wall 920. The tip 901 includes a pair of spaced apart projecting members (or tabs) 1001 that extend outwardly from and generally perpendicular to the bottom wall 910. A face of each projecting member 1001 includes alternate elongate ribs 924 and grooves 926 formed along the length of the projecting member.

The base member 902 includes a body 930 having a generally planar top wall 932 and a pair of spaced apart generally planar side walls 934. The bottom wall 910 of the tip 901 is adapted to engage the top wall 932 of the base member 902. The body 930 includes a pair of spaced apart cavities 1002 with each cavity 1002 having an opening formed in the top wall 932. An internal face of each cavity 1002 includes alternate elongate ribs 1024 and grooves 1026 formed along the length of the cavity. The projecting members 1001 are adapted to be matingly inserted into a respective cavity 1002 such that each rib 924 of a projecting member 1001 is located within a respective groove 1026 of a cavity 1002 and such that each rib 1024 of a cavity 1002 is located within a respective groove 926 of a projecting member 1001. These ribs and grooves engage and interlock with one another when the tip and base are assembled to help hold the two portions snugly together. The projecting members 1001 and cavities 1002 form a mounting mechanism for mounting the tip member 901 to the base member 902.

The base member 902 also includes a projection 1003 that extends outwardly from and generally perpendicular to the top wall 932 of the body 930. The projection 1003 encapsulates a portion of a strain gage assembly molded in place within the base member. This strain gage assembly is discussed in more detail subsequently. The strain gage projection 1003 is adapted to slide into a mating cavity 1012, shown in FIG. 11, in the tip 901. The cavity 1012 includes an opening 1014 in the bottom wall 910 of the tip 901 between the projecting members 1001.

Other physical features of the blade 900 that are readily visible in FIGS. 9, 10A, and 10B include a mounting bore 903 in the base 902 that is intended to accommodate a mounting mechanism, such as a cross shaft, for the blade 900. In typical installations, as suggested previously, multiple blades are mounted side-by-side to span even a wide conveyor belt, and the mounting mechanism generally includes some type of adjustable tensioner to vary the scraping engagement force between belt and blade. This tensioning device is discussed in more detail below.

Figure 11:
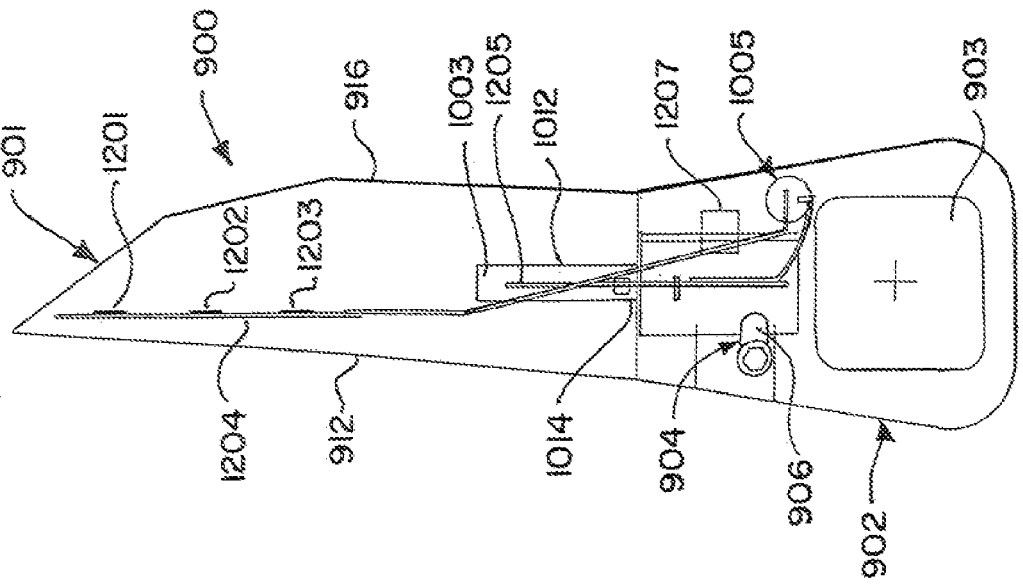
FIG. 11 is a side elevational view depicting interior details of the scraper blade of FIG. 9.

Also illustrated in FIGS. 9 through 10B is one embodiment of a locking mechanism designed to removably secure the tip 901 and base 902 together. It should be noted that each of the projecting members 1001 that extends from the bottom wall of the tip portion 901 has a transverse groove 1004 along one face. When the tip 901 and base 902 are engaged, a locking rod 904 is inserted into a lock bore 1006 that extends through the base 902 between its opposing side walls 934. This locking rod 904 preferably provides a camming action, so that a projecting lobe 906 on the locking rod 904 as shown in FIG. 11 can be rotated into engagement with the transverse grooves 1004 such that the projecting members 1001 can not be removed from the cavities 1002, or can be rotated out of engagement with the grooves 1004 such that the projecting members 1001 can be removed from the cavities 1002. It is believed that rotating the locking rod 904 in and out of engagement is much easier than attempting to longitudinally withdraw the locking rod 904 altogether from the bore 1006, particularly when the locking rod is used to hold multiple adjacent blade and base sections together. An actuator mechanism such as a lever or knob is contemplated for one or both ends of the locking rod 904, in order to make it easier for an operator to rotate the rod 904 as required. It is also contemplated that a securing mechanism may be associated with the lever or knob, although these details are not illustrated in the drawing figures.

There is also an additional bore 1005 provided in the base portion 902 that extends through the base 902 between its opposing side walls. This particular bore 1005 is designed to accommodate the wiring that would normally extend from the sensors disposed on the tip portion 901, and from the strain gage assembly that is encapsulated in the base 902. None of the wiring is visible in FIGS. 9 through 10B, although these details are dealt with subsequently.

It is conceivable that one may connectorize the sensor wiring for ease of assembly/disassembly. Specifically, electrical contacts 1006 may be integrally formed as a part of the alignment and engagement grooves and ribs that appear on both of the projecting members 1001 of the tip 901 and in the mating cavities 1002 of the base 902. Such contacts may be disposed along these mating surfaces using known electroplating or deposition techniques, then the wires extending from the embedded sensor units may be attached to these electrical connections as a post-molding operation. Of course, it is also possible simply to collect the sensor wires into a cable bundle as discussed above, and to use electrical connectors in attaching the sensor leads to electrical signal distribution cables disposed along the conveyor belt cleaning assembly.

Figure 12:
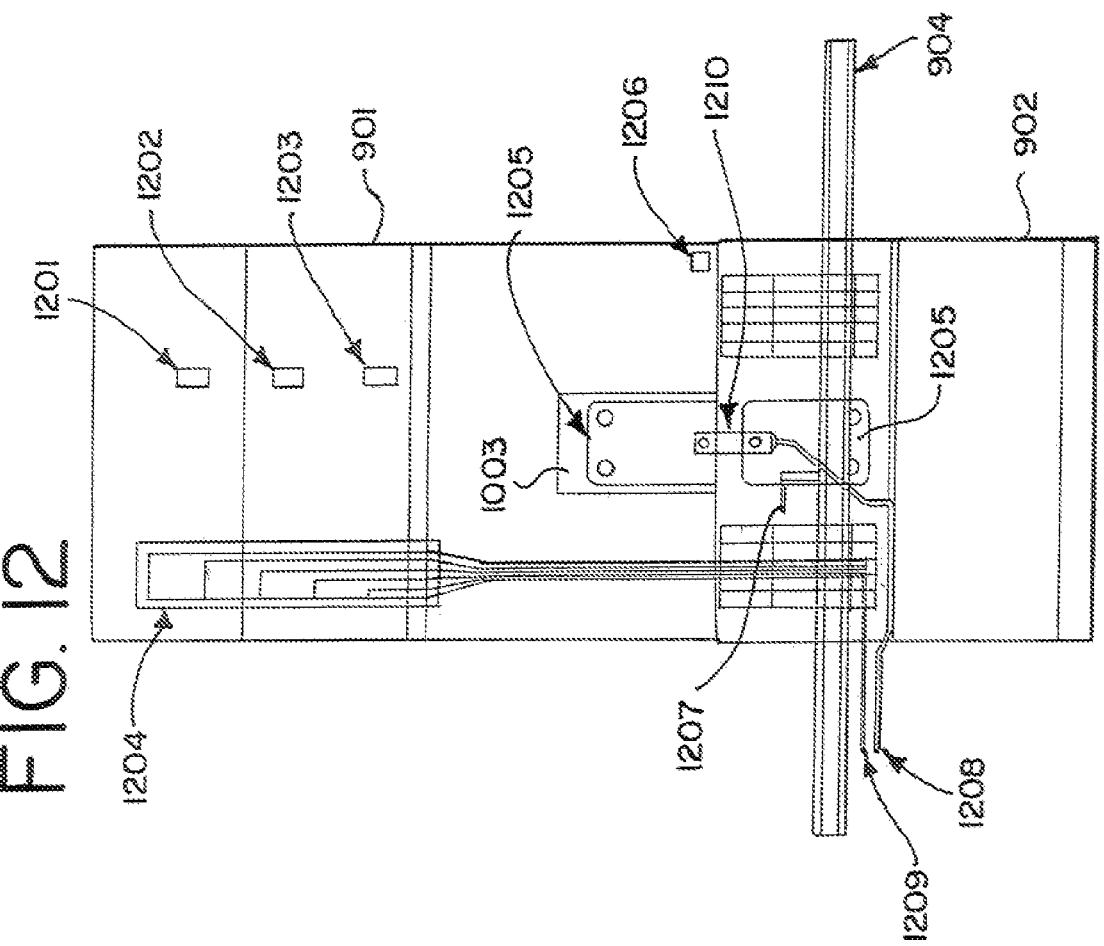
FIG. 12 is a front elevational view depicting interior details of the scraper blade of FIG. 9.

Interior views of this embodiment of the scraper blade assembly 900 are shown in FIGS. 11 and 12, featuring considerable interior sensor detail. One should note that the camming nature of the locking bar 904 is particularly evident in the side view of FIG. 11. The cam lobe 906 of the locking bar 904 is adapted to rotate out of the locking grooves 1004 and into a recess provided inside the base 902. Of particular interest in the views provided in FIGS. 11 and 12 are the sensors, notably the blade wear sensor 1204, temperature sensors 1201-1203, and the strain gage 1210 of the strain gage assembly. The temperature sensors 1201-1203 are entirely conventional in design, and are simply embedded in the tip 901 by mold-in-place. The temperature sensors 1201-1203 are typically aligned vertically as shown in order to monitor temperature along the tip member. Three temperature sensors, spaced evenly, are preferably used so that temperatures can be extrapolated throughout the remainder of the blade.

The wear sensor 1204 uses a unique geometric design. As is evident from an inspection of FIG. 12, the wear sensor 1204 is preferably a series of concentric conductive loops. Each of the loops features one electrical connection that is common to all of the loops, and one connection that is unique to a particular loop. For this reason, a wear sensor with five concentric loops requires six electrical connections to the electrical conductors within the geometry. The wear sensor 1204 may include one or more loops. A wear sensor 1204 including a single loop will indicate when a scraper blade is worn to a selected extent, such as completely worn such that replacement is required.

In one implementation, the concentric loop conductor pattern may be deposited, such as by conductive ink printing, electroplating, or other known process, between two non-conductive layers, such as an acetate material. This is the construction technique used in conventional "flex" circuits, such as might be found in modern electronic equipment. As the blade tip 901 wears, the conductive loops are worn away one-by-one, from the outermost loop to the innermost loop thus progressively eliminating conductive paths. One can then "bracket" the remaining tip length in this quantized fashion by knowing which loops are missing and which still remain.

FIG. 12 also depicts the tip member 901 as including an ID (identification) tag 1206. In the preferred form of the invention, an RF (radio frequency) tag system is used, in which a small transmitter sends a unique digital ID stream to a receiver. The ID tag 1206 uniquely identifies the blade tip 901 to ensure, among other things, that the blade tip 901 is the appropriate blade for the cleaning application. In the preferred form of the invention, the ID tag 1206 is a CTTC4S active RFID tag manufactured by CopyTag Limited of Harlow, Essex, U.K. Of course, other RFID tag systems having similar specifications may also be suitable for use with the present invention. Operation of a conveyor belt scraper blade control system may be disabled if the appropriate blade is not detected.

FIG. 12 further illustrates a radio transmitter 1207 intended for telemetry transmission. Sensor data from the tip sensors (temperature and wear rate, at least) may be transmitted by wireless means to eliminate the need to string wires from tip 901 to base 902, and from each base member to an appropriate data input module disposed near the scraping blade assembly.

As shown in FIGS. 11 and 12 the base member 902 includes a strain sensor. The strain sensor may be implemented using available devices, although one embodiment features a strain gage assembly including a strain gage sensor 1210 attached to a set of amplifier or magnifying plates 1205. In the embodiment illustrated, one of the magnifying plates 1205 is firmly embedded in the body 930 of the base 902, while the other plate 1205 is encapsulated within the projection 1003 so that it extends outwardly from the body 930 of base 902 and into the cavity 1012 in the tip 901 (as discussed above). FIGS. 13 and 14 illustrate the strain gage assembly including strain gage sensor 1210 and the signal magnifying plates 1205, as well as showing how the sensor cabling 1208 is dressed along the plates 1205. As shown, the strain gage 1210 is secured to the magnifying plates 1205 by screws 1701 and nuts 1702. It is intended that the strain gage wires 1208 be dressed through opening 1005 in the base 902, then passed through the openings 1005 in adjacent bases until all of the sensor wires are connected to an input module for the control system. Of course, as noted above, it is also possible that strain gage data could be transmitted wirelessly as well, such as over an RF or optical channel.

The strain gage 1210 itself functions on the principle that when it undergoes strain, its electrical resistance changes. And if the relationship between the relative change in resistance ($\Delta R/R$) and the strain ($\Delta L/L$, which is defined as the gage factor) is known, then the strain can be determined. All that is necessary therefore is to measure $\Delta R/R$. But this is more easily said than done because the values of $\Delta R$ are very small (and $\Delta R/R$, even smaller). In implementing the strain gage sensor assembly 1210, four strain gages are put into a Wheatstone bridge configuration (full bridge with four sensors). This circuit provides a linear relationship among the input voltage, change in resistance values, and output voltage. The output voltage is still small and is consequently run through an amplifying circuit to obtain higher voltage readings.

The purpose of the magnifying plates 1205 is two-fold. First, the plates 1205 provide an insertion method into the mold. More importantly though, the plates 1205 increase the "area of effect" of the strain gage 1210. The "magnifying" effect of the plates is evident if two cases are considered. The first case, shown in FIG. 15, is a single thin beam sensor embedded in a urethane bar with no plates attached. The second case shown in FIG. 16 is the same beam with an embedded sensor, this time with plates 1205 attached to the ends of the sensor 1210 (a plate is bolted onto each end of the sensor beam).

The plates 1205 greatly extend the measurement range. The output signal is proportional to the beam deflection (or strain) by a relationship of the form:

$$\text{signal} \propto \int_A^B \Delta dL \text{ or } \int_A^B \varepsilon dL \text{ for case}(1)$$

$$\text{signal} \propto \int_{A'}^{B'} \Delta dL \text{ or } \int_{A'}^{B'} \varepsilon dL \text{ for case}(2)$$

As is evident, the signal produced by the sensor/plate arrangement in FIG. 16 will be much greater than the sensor alone as in FIG. 15 (due to the extended length of the plates).

Another amplification effect is related to the width of the plates 1205. The proportionality relationships above would need to be multiplied by element width to get the total strain/deflection effect. Because the plates are much wider than the sensor itself, this further amplifies the effect of the blade deflection on the signal.

The width and thickness of the magnifying plates 1205 were chosen to fulfill two purposes. One is the amplification factor described above. Second, the plates cannot be too wide or too thick. The thickness and width of the plates should be chosen to maximize the amplification while not affecting the overall performance of the blade (if the plates are too wide or thick the flexural performance of the blade is affected—which is not desirable). There appears to be no special or unique shape to the magnifying plates. The plates can be rectangular, circular, elliptical, etc. The length, width, and plate thickness are the important dimensions in this design. A preferred magnifying plate is approximately two inches long, approximately one and one-quarter inches wide, and approximately 0.050 inches thick.

This arrangement (sensor/plates) gives an excellent signal that is indicative of blade flexure during operation (blade performance). An added feature of this construction is that it minimizes the effect of longitudinal vibration—which is more related to the type of urethane used to mold the blade than blade performance (vibration transmitted axially through the blade will not be amplified by the plates, and consequently will be of much smaller magnitude).

The strain sensor may alternative comprise a mechanical sensor, such as a contact switch, wherein strain is sensed mechanically. The mechanical contact switch is embedded within the scraper blade. When sufficient strain is placed on the blade the contact switch closes and provides a signal indicating that the scraper blade is engaging the conveyor belt with sufficient force. When the contact switch is open, it provides an indication that there is not enough strain in the scraper blade to provide the designed engagement force between the scraper blade and the conveyor belt. The contact distance the contact must travel to close the contact switch can be adjustable, such as by a set screw, whereby the contact switch strain sensor can be adjusted to close at selected magnitudes of strain depending upon the conditions in which the scraper blade will be used.

Other sensing elements were tried. Biaxial elements were used, mounted externally on the cross shaft, with some success. Triaxial elements were determined not to be necessary as little vibration is transmitted on the cross shaft axis. Accelerometers could easily be mounted internally (inside the blade) but they are expensive, especially the higher temperature accelerometers necessary to withstand the embedding procedure—urethane reaction temperatures can exceed 250° F.

FIGS. 17 and 18 depict multiple blade units 900 configured side-by-side along a cross shaft (mainframe) 1401 having a linear control axis 1406. It can be seen in particular how the tip locking device 904 is inserted through all of the adjacent bases 902 in order to secure the blade tips 901 in position.

One embodiment of a system for monitoring and status display of a conveyor belt cleaner involves a novel way of employing wear circuit detection circuitry. In this form of the invention, an indicator box is placed outside the conveyor chute and is equipped with visual indicators and connection points for a programmable logic controller (PLC). In this embodiment, rather that being limited to the relatively small number of wear levels obtainable through the flexible wear circuit described above, a method has been developed, using looped wires and an adjustable mold, to realize more flexibility in the spacing of the wear detection levels (i.e., one can establish better control of the final wire spacing and not be limited to the fixed increments of the flexible circuit wear rate sensor).

Figure 19:
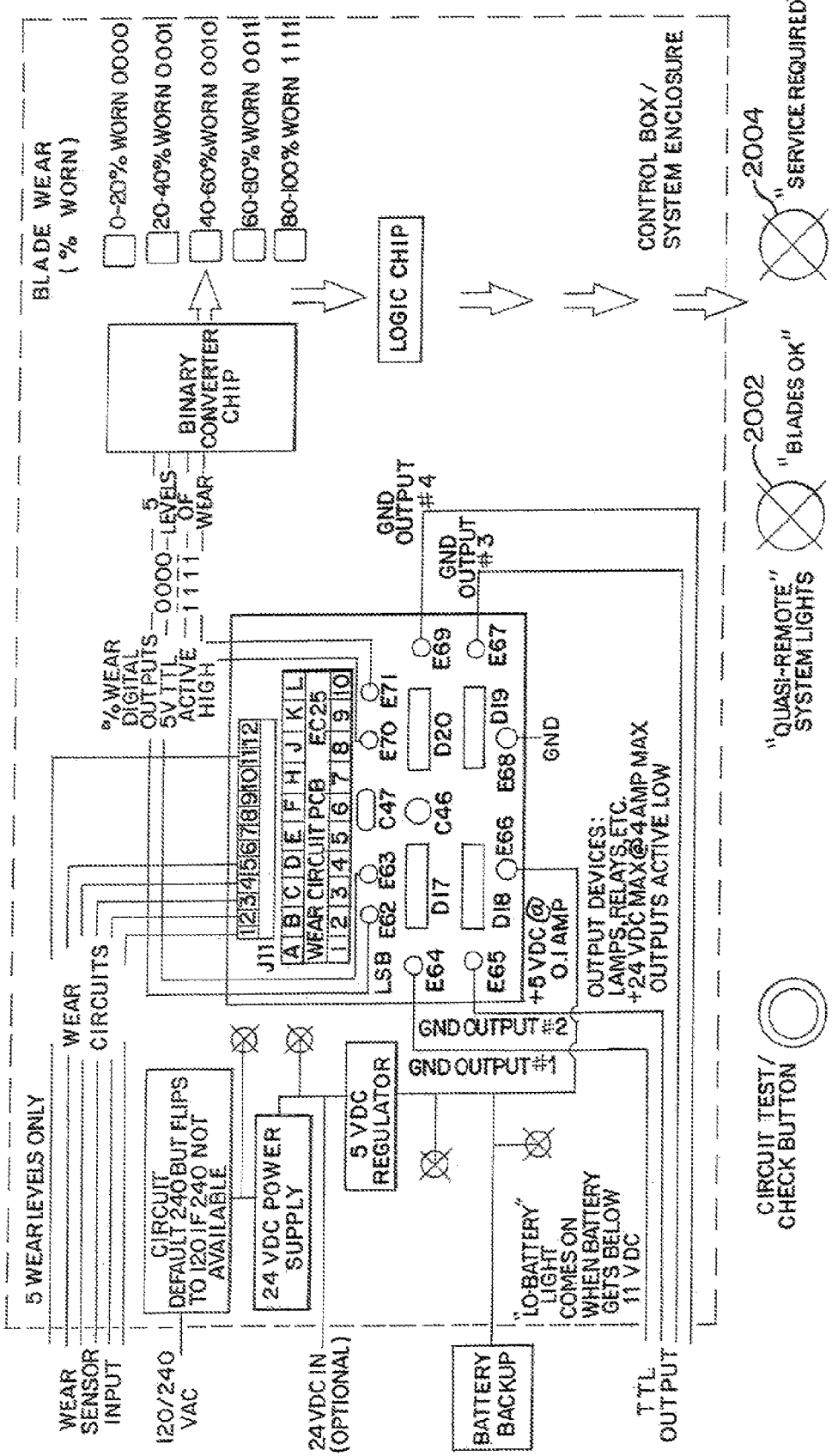
FIG. 19 depicts a monitoring and display system suitable for use in still another embodiment of the present invention.
Figure 20:
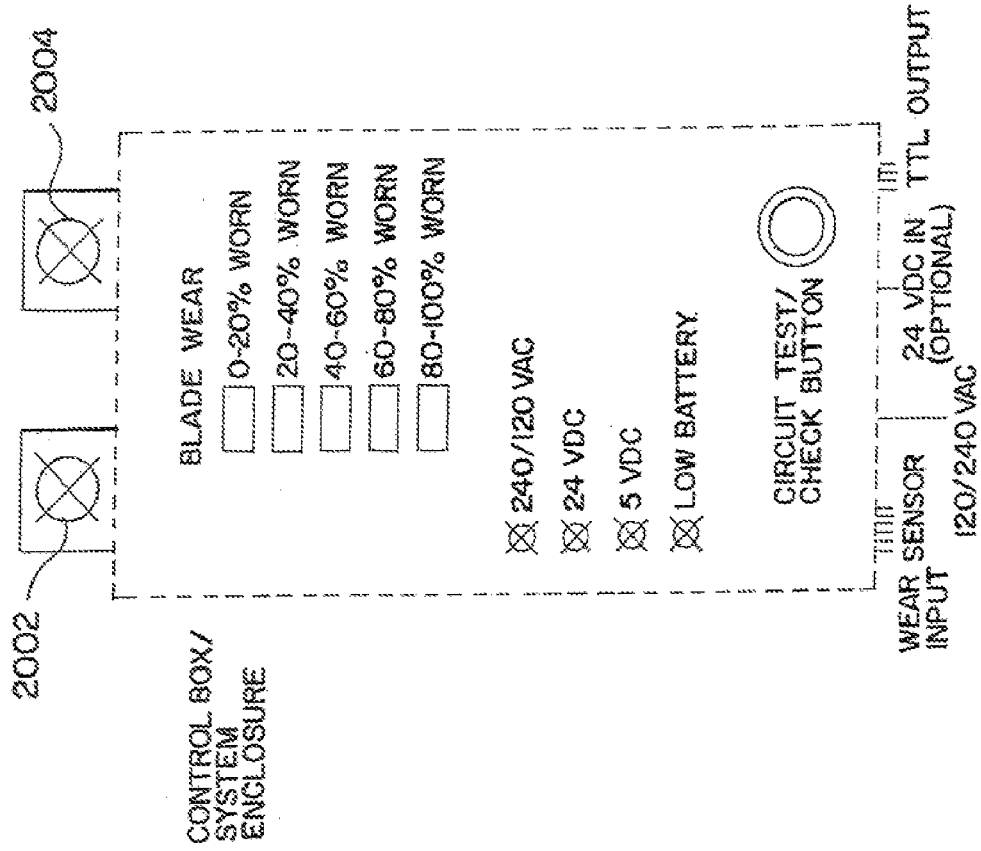
FIG. 20 illustrates a front panel for a display unit in accordance with the present invention.

A monitor and display unit for such a system is shown in FIG. 19. The circuitry itself is installed in a typical control-type enclosure (with NEMA, explosion proof, etc., options available), with a front panel arranged as in FIG. 20. The looped wire configuration wear circuit is coupled to the indicator unit of FIG. 20. As the cleaner blade wears out, the wire loops (2601 in FIG. 21) in the blade are broken and a series of LED's (light emitting diodes) on the front panel are actuated, indicating the wear level of the blade as a percentage. Two larger visual indicators are used so that the wear status of the blades is visible from a distance. The "blades OK" indicator 2002 and "service required" indicator 2004, are higher intensity LED's. The "service required" indicator is turned ON (and "blades OK" turned OFF) when the wear level reaches 80-100% worn, for example.

Figure 21:
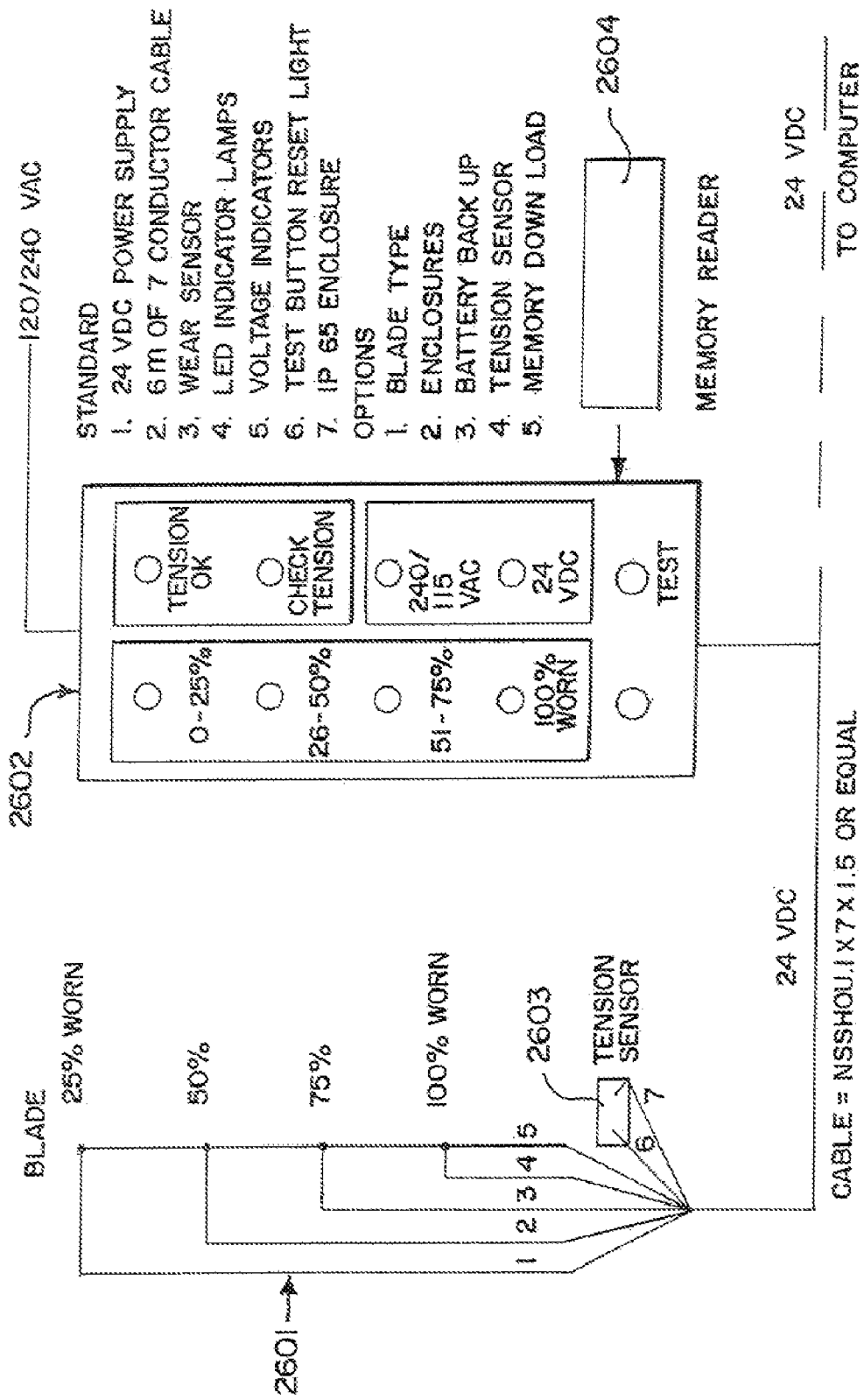
FIG. 21 shows the partial interconnection of system components for the monitor and display system of FIG. 19.
Figure 24A:
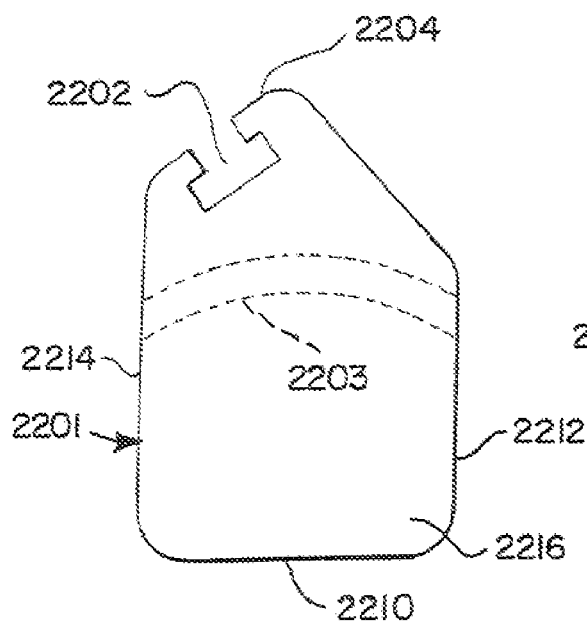
FIG. 24A is a left side elevational view of a base attachment piece.
Figure 24B:
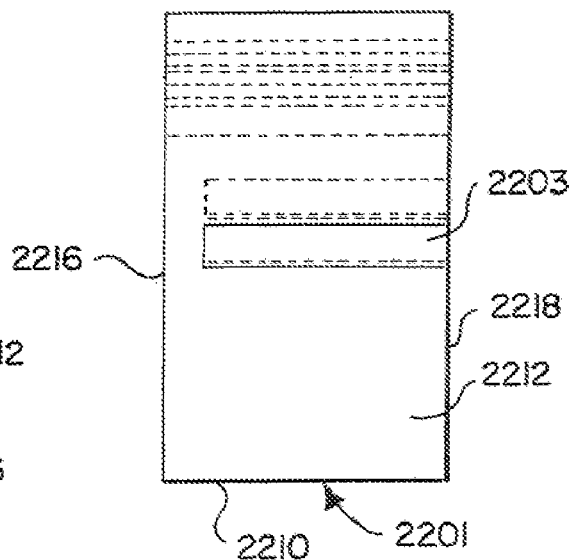
FIG. 24B is a front elevational view of the base attachment piece of FIG. 24A.
Figure 24C:
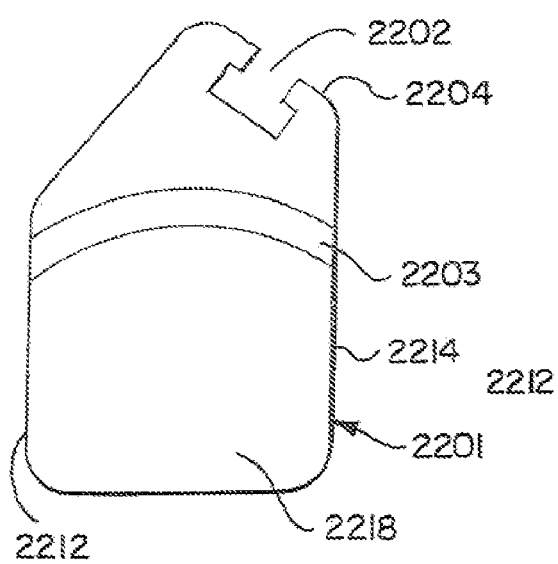
FIG. 24C is a right side elevational view of the base attachment piece of FIG. 24A.
Figure 24D:
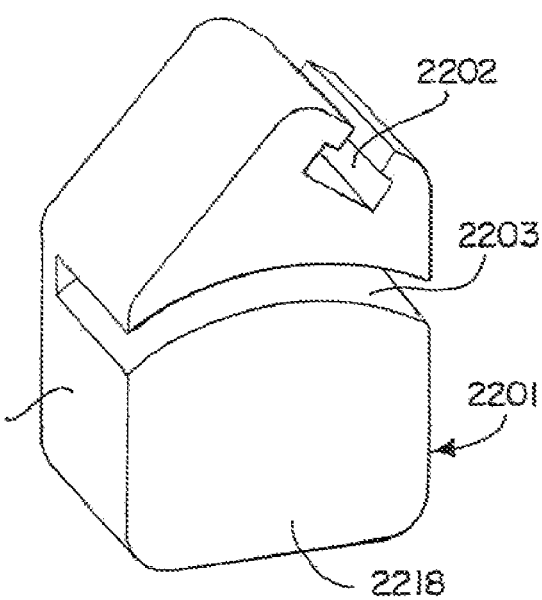
FIG. 24D is a perspective view of the base attachment piece of FIG. 24A.

In addition, there are four wireable TTL (transistor-transistor logic level compatible) outputs that can be connected to existing PLC equipment (as a 4-bit digital signal). These outputs are "output active low" and can be up to 24 VDC (volts direct current) with up to a 1 ampere source or sink capability to drive relays or other transducers in addition to standard digital signal inputs. FIG. 21 also indicates a tension sensor element 2603 (embedded strain gages) disposed proximate the wire loop wear sensor 2601 that indicates whether the blades are functioning properly, a display unit 2602, and a memory unit 2604 capable of tracking hours of operation, wear level, station ID, etc. The tension sensor element 2603 may be implemented in a variety of ways, such as embedded strain gages or load cell-torque elements attached either to the cross shaft or externally on the tensioning system, for example. In other words, there is more than one suitable way to measure applied force in this application.

Figure 22:
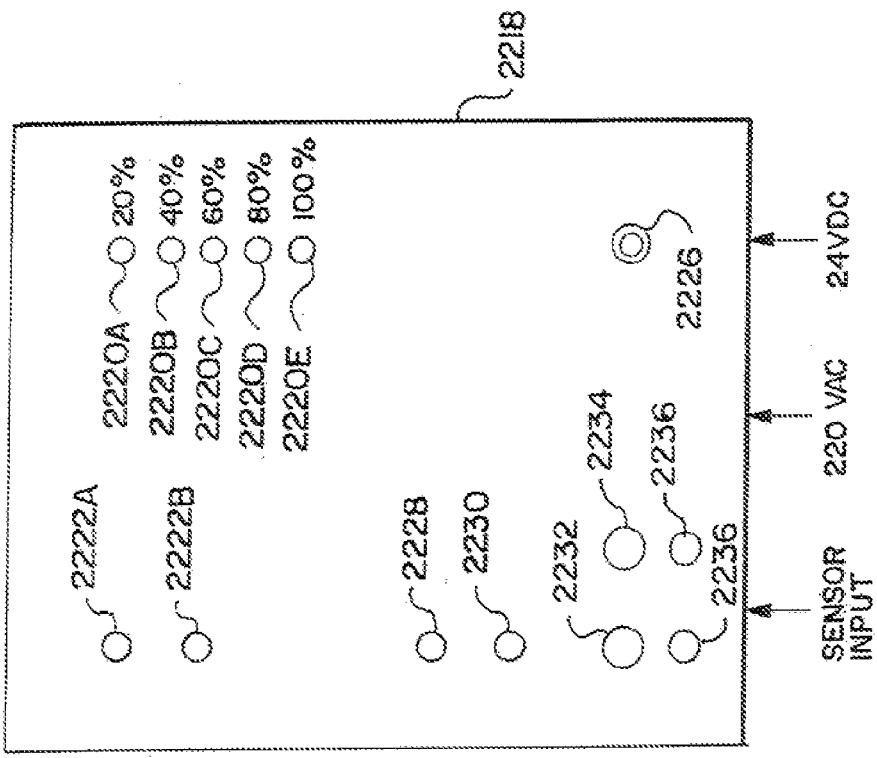
FIG. 22 illustrates another embodiment of a front panel for a display unit in accordance with the present invention.

Another embodiment of a monitor and display unit 2218 is shown in FIG. 22. The wear circuitry has three different sources of power, namely 220 VAC, 24 VDC and a battery, that can be used independently or simultaneously. In case of an external power failure the circuit will automatically run on battery power. The battery is constantly charged by either the 220 VAC or 24 VDC power supply. When the scraper blades are new all five wear indicator lights 2220A-E, such as LED's, are lit or on, and the upper remote alarm light 2222A will also be on. The lights 2220A-E respectively turn off when the scraper blade is twenty percent worn, forty percent worn, sixty percent worn, eight percent worn and one-hundred percent worn. When the blade is eighty percent worn the light 2220D turns off, the upper remote alarm light 2222A will also turn off, and a lower remote alarm light 2222B will turn on. When the blade is one-hundred percent worn the light 2220E will turn off and the remote alarm lights 2222A and B will start flashing. The display unit 2218 also includes a system test button 2226, a DC power on indicator light 2228, an AC power on indicator light 2230, an AC power on button 2232, an AC power off button 2234, and fuses 2236.

The blade wear sensor 2601 as shown in FIG. 21 is actually implemented as true embedded wires in accordance with this embodiment. Embedded wires form an eminently suitable and economical implementation for blade wear sensing, provided the wires can be supported properly for mold-in-place into the urethane mold. As noted previously, cost of the flexible circuit and limitations in wear circuit geometry can pose problems in some installations.

One technique for implementation of actual wire loops such as those of the blade wear sensor 2601 within a blade structure is the use of a multi-step pouring method to embed the looped wires into the cleaner blades. The first step is to locate the looped wires in a molded polyurethane "panel" 2002, as illustrated in FIGS. 23A-C, that is later inserted into the actual cleaner blade mold. The flat wear panel 2002 is adjustable in length and also allows one to vary the wire spacing. Thus, the panel 2002 can be changed to fit into a variety of different cleaner blades (different profiles, sizes, and with different wearable lengths) without having to make more molds. The flat piece/wear panel 2002 is then pressed between two steel plates in the shape of the profile of the cleaner blade the wear panel is to be inserted into. This forces the wear panel to take the shape of the cleaner blade profile (if a polyurethane piece is pressed into a shape before it is "cured" it will keep that shape after it cures).

The wear panel 2002 is adjustable and includes "half moon" curved spacer pieces 2301 that can be placed anywhere along the length of the panel, and the length of the final panel can be varied by putting a plug into the end of the mold for the panel 2002 (a 4 inch to 14 inch insert piece can be poured), or by cutting the panel 2002 to size after molding. The panel 2002 includes a plurality of apertures 2304 that extend along the central linear axis of the panel 2002, and flanges 2306 located along opposing sides of the panel 2002. The bottom end of the panel 2002 includes a general T-shaped member 2308. The "half moon" spacer pieces 2301 are positioned using locating screws 2310 that extend through respective apertures 2304. Each wire of the wear sensor 2601 is looped around a respective "halfmoon" spacer piece 2301. These spacer pieces allow one to customize placement and spacing of the wear rate sensor wires (they can be placed as close as 0.7 inch apart with no real limit on the upper spacing). It should be noted that the circuitry used to convert the wear levels into an output signal is set up to accept either a 5 level or 10 level wear circuit (or 5 or 10 level looped wire setup). The varying diameter/width of these "half moon" spacer pieces allow the wires to be offset, preventing interference and the possibility of an erroneous signal.

The second piece required for this new wear rate sensor methodology is a base-attachment piece 2201. The function of this piece is to secure the wear panel piece 2002 into the cleaner blade mold for final production. A base attachment piece 2201 for one cleaner blade style is shown in FIGS. 24A-D. The base attachment piece 2201 includes a planar bottom wall 2210, a planar front wall 2212, a planar rear wall 2214 spaced apart and parallel to the front wall 2212, a planar first side wall 2216, and a planar second side wall 2218 that is spaced apart and parallel to the first side wall 2216. The upper end of the attachment piece includes a generally T-shaped slot 2202 that is located in an upper wall 2204 and that extends between and through the side walls 2216 and 2218. The base attachment piece 2201 locates the T-shaped member 2308 of the wear panel 2002 in slot 2202 and secures the panel 2002 in the cleaner blade mold for final pouring. The base attachment piece also includes a curved slot 2203. The curved slot 2203 includes a rectangular opening in the front wall 2212 and rear wall 2214, and a curved opening in the second side wall 2218.

Figure 26:
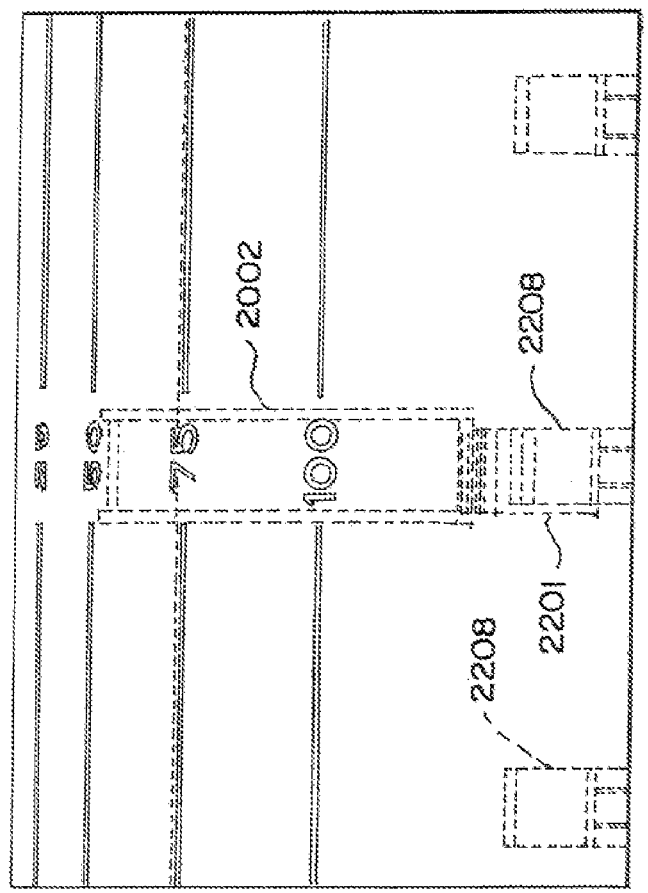
FIG. 26 is a front elevational view of a scraper blade formed by the mold of FIG. 25.
Figure 25:
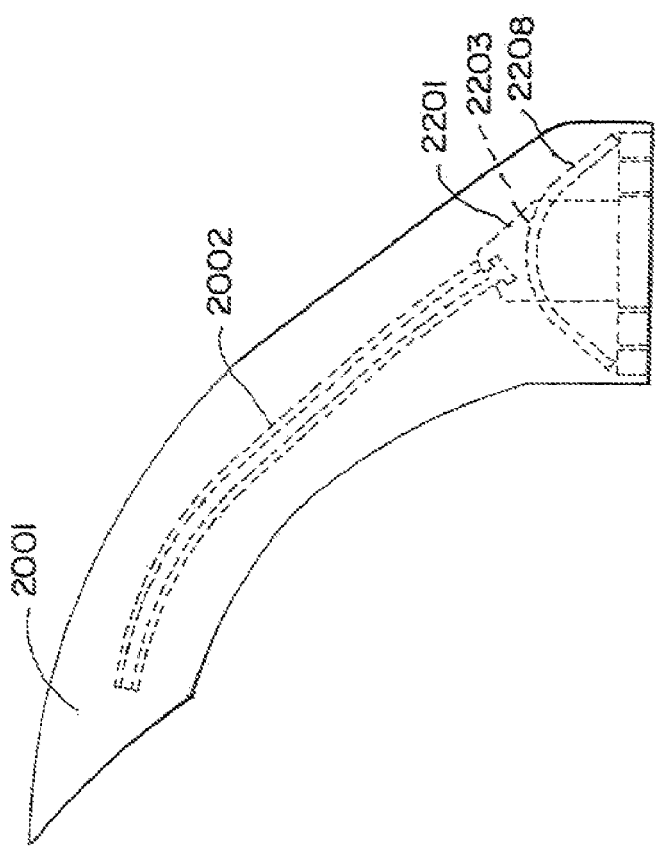
FIG. 25 is a side elevational view of a cleaner blade mold suitable for forming a scraper blade in accordance with yet another embodiment of the present invention.

The two pieces, wear panel 2002 and base attachment piece 2201, are fit together by the interference fit slot 2202 as noted, the male T-shaped end 2308 on the wire-locating panel 2002 being slidably inserted into the female T-shaped slot 2202 on the base-attachment piece 2201. These pieces are put together and placed/located in the "final" cleaner blade mold 2001 using the base-attachment piece as shown in FIG. 25. For example, as shown in FIG. 25 the base-attachment piece 2201 depicted in FIGS. 24A-D fits over a standard metal insert 2208 within the mold 2001 with the insert 2208 being located within the curved slot 2203. The base-attachment piece 2201 fits into/around the metal insert 2208, placing and securing the wire-locating mold piece 2002 and the wear rate sensor attached thereto into the final scraper blade mold 2001 for pouring. The resulting scraper blade is shown in FIG. 26.

Figure 27:
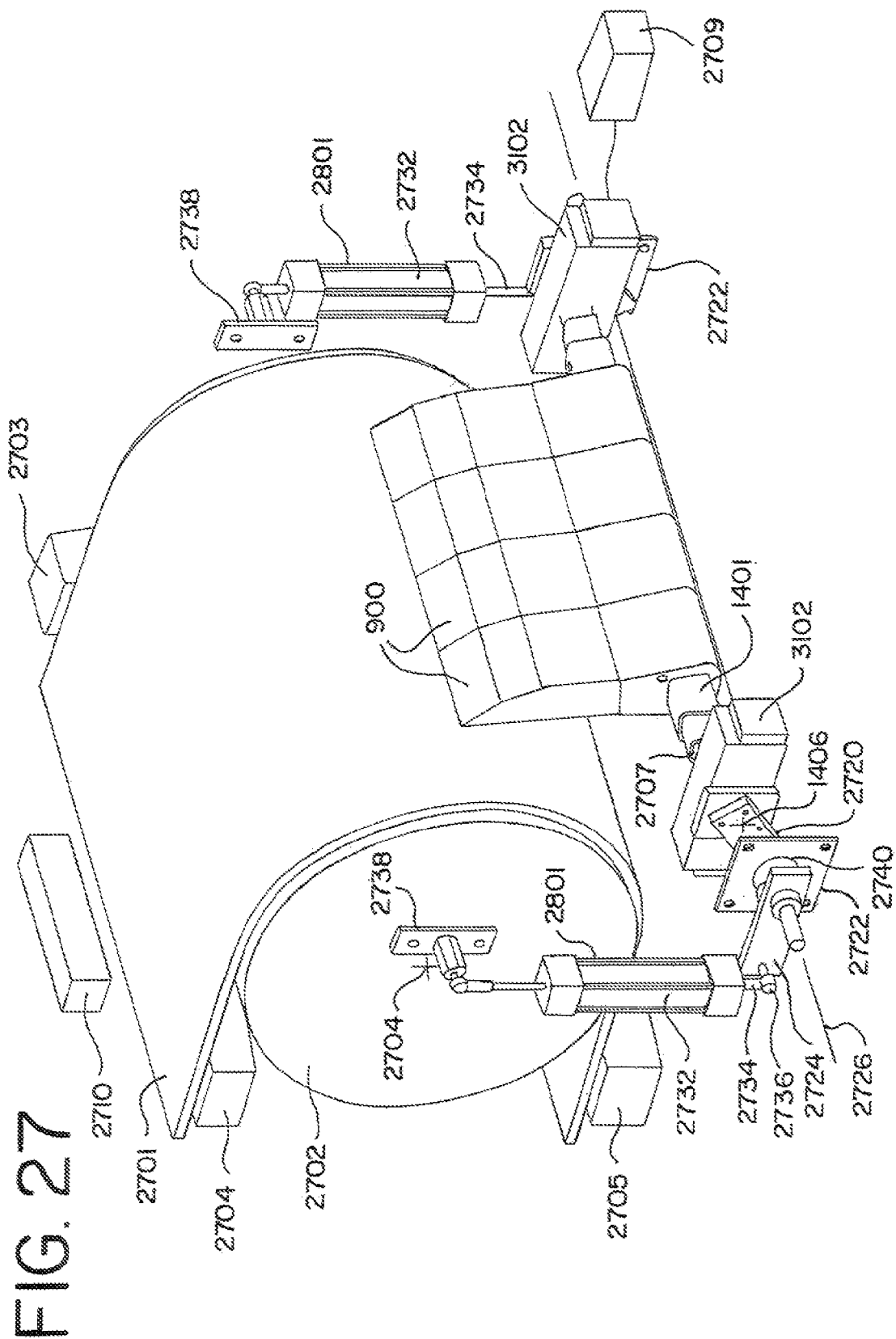
FIG. 27 is a perspective view of system components and identification of sensors used during operation of a system in accordance with the present invention.

A control system designed for proper operation of a completely automated conveyor belt cleaner scraper blade installation, as shown in FIG. 27, determines its operational parameters at start-up, performs a self-calibration, and moves the scraper blades into a properly computed engagement attitude and pressure with respect to the belt.

As shown in FIG. 27, one or more scraper blades 900 are mounted on the cross shaft 1401. The scraper blades 900 and cross shaft 1401 are conjointly rotatable about the axis 1406 of the cross shaft 1401. Each end of the cross shaft 1401 is attached to a rotary actuator 3102 that provides selective rotation of the cross shaft 1401 and scraper blades 900 about the axis 1406. The rotary actuators 3102 may be pneumatic rotary actuators, such as the PHD Model RLS1 63×270 rotary actuator. A torque sensor 2709, such as the Parker Pneumatic P3P-R Series electro-pneumatic pressure regulator, is coupled in fluid communication with the rotary actuators 3102. The torque sensor 2709 includes a pressure sensor and a valve that regulates the pressure of the air that is supplied to the rotary actuators 3102. The torque sensor 2709 provides an output signal that is indicative of the pressure of the air supplied to the rotary actuators 3102. The torsional output force of the rotary actuators on the cross shaft 1401 is calculated from the pressure of the air supplied to the rotary actuators 3102. The force with which the scraper blades 900 engage the belt is selectively adjusted by the torque sensor 2709 varying the pressure of the air supplied to the rotary actuators 3102. If desired, a torque sensor 2707, such as a Transducer Techniques TRS series flanged reaction torque sensor, may be used to couple one end of the cross shaft 1401 to one of the rotary actuators 3102. The torque sensor 2707 measures the magnitude of the torsional force with which the rotary actuators 3102 rotate the scraper blades 900 into scraping engagement with the belt 2701 and provides a corresponding output signal.

Each rotary actuator 3102 is attached to a first end of a first bracket 2720. The second end of the first bracket 2720 is rotatably mounted to a stationary support member such as a mounting plate 2722. The second end of the first bracket 2720 is fixedly attached to the first end of a second bracket 2724.

The first bracket 2720, second bracket 2724, rotary actuators 3102, cross shaft 1401 and scraper blades 900 are adapted conjointly rotate about a linear axis 2726. A linear actuator 2801 having a cylinder 2732 and an extendable and retractable ram 2734 is pivotally attached at one end to the second end of the second bracket 2724 for pivotal movement about an axis 2736, and is pivotally attached at a second end to a stationary support member such as a mounting bracket 2738. The linear actuator is preferably pneumatically operated, but could be hydraulically operated if desired. Selective extension/retraction of the ram 2734 conjointly rotates the brackets 2720 and 2724, rotary actuators 3102, cross shaft 1401 and scraper blades 900 about the axis 2726 to a desired rotational position which is adjusted as the scraper blades 900 wear. An angular displacement sensor 2740, such as the Baumer Electric MDRM 18U9501 magnetic encoder, senses the rotational position of the brackets 2720, 2724, rotary actuators 3102, cross shaft 1401 and scraper blades 900 about the axis 2726. The radial displacement and the angle of attack of the scraper blades 900 is selectively adjusted by the actuators 3102 and 2801. Each actuator 2720 and 2801 may respectively include a position sensor to provide a signal indicative of the position of the actuators 2720 and 2801 from which the position and cleaning angle of the scraper blade 900 can be computed. The position sensors may be linear or rotary variable resistance sensors.

Operational attitudes for a scraper blade assembly are illustrated in FIGS. 28A-C. FIG. 28B depicts an initial attitude in which the blade assembly 900 is in proper initial scraping engagement with a conveyor belt 2701. The head pulley 2702 for the belt 2701 is located near the discharge end of the conveyor. The head pulley rotates about a central linear axis 2704. FIG. 28A depicts an attitude in which the blade 900 is completely worn and requires replacement. FIG. 28C depicts an attitude in which the blade 900 is positioned for maintenance, such as the removal of a worn blade 900 and replacement with a new blade.

It is also envisioned that data gathered and stored from each installation may have significant impact on problem tracking at specific installations, as well as the establishment of programmed maintenance schedules that can lead to recommendations to the end user on when to replace the tips 901 for a particular belt. The control system also has the capability to activate both local and remote alarms to notify the user about relevant conditions.

A noteworthy aspect of the control system of the present invention is that the sensors and positioning mechanisms described do not directly measure the angle of attack that the scraper blade makes with the belt. This information is computed based upon the known position of the radial tensioner 3102 with respect to the belt, combined with the known length of the scraper blade tip and base. Of course, depending upon the specific embodiment used for the wear rate sensor, the length of the scraper blade is only known within a range that is dependent upon the distance between sensor "tracks" of the blade length sensors. Similar calculations can be made even if the pneumatic positioning cylinders are eliminated from the installation because of space considerations.

As depicted in FIG. 27, a variety of sensors are available for the central controlling processor of this system to evaluate. As mentioned above, there are both temperature sensors and strain gage sensors within the blade. There may be a material detection sensor 2710 located close to the belt, such as a Baumer Electric Model FHDM 16P5001 photoelectric diffuse sensor, although non-photoelectric sensors may be used.

The material detection sensor 2710 determines whether there is material on the belt being transported. There may also be a belt speed sensor 2703, such as a Siemens Milltronics Model RBSS (Return Belt Speed Sensor), for determining the speed of the belt. There may be a material carry back sensor 2705 for sensing whether and to what extent conveyed material remains adhered to the belt after passing by the scraper blades 900, such as the ICT Automated Carryback Monitor of ESS Engineering Services and Supplies in Corrumbin, Australia. A belt splice detector sensor 2704, such as the GO Switch Model 11-12528-A3 sensor, may be provided for sensing the location of the belt splice as it approaches the scraper blade 900. In addition, there may be a sensor for ambient air temperature to provide baseline data for the other temperature sensors.

A great deal of information is derived from the blade-mounted temperature sensors and strain gage sensors to enable an accurate determination of whether the blade is engaged against the belt with the proper force to provide proper cleaning. One may also be able to predict when the belt coupling (or splice) is approaching the blade (based upon strain gage information and computation using belt speed information), even without a specific splice detection sensor 2704. It is conceivable that blade engagement force may need to be reduced prior to the belt coupling passing under the blade. The type of action to be taken in response to belt coupling approach may depend upon the style of belt tensioner and positioning mechanism used in a particular installation. At the very least, sensor data enables a determination of when the blade should be replaced, as well as providing an indication that blade position and engagement tension or force are correct with respect to the belt in use and the material conveyed.

It is also noteworthy that, since a microprocessor is used in the data gathering and computation platform, a database of sensor information can be maintained offline. Such a database could be maintained locally or transmitted to a remote location (such as via the Internet) for storage. It may be possible to analyze accumulated data for additional information about a particular customer location.

The preferred embodiment of the control system includes a microprocessor for receiving and analyzing the signals and information represented thereby from the sensors placed at various positions within the system. However, the conveyor belt cleaner system can be controlled without the use of a microprocessor, such as by use of analog logic circuits including, for example, on-off switches, relays and indicator lights. Similarly, digital logic, short of a microprocessor, could also be used to receive and interpret sensor signals.

Figure 29:
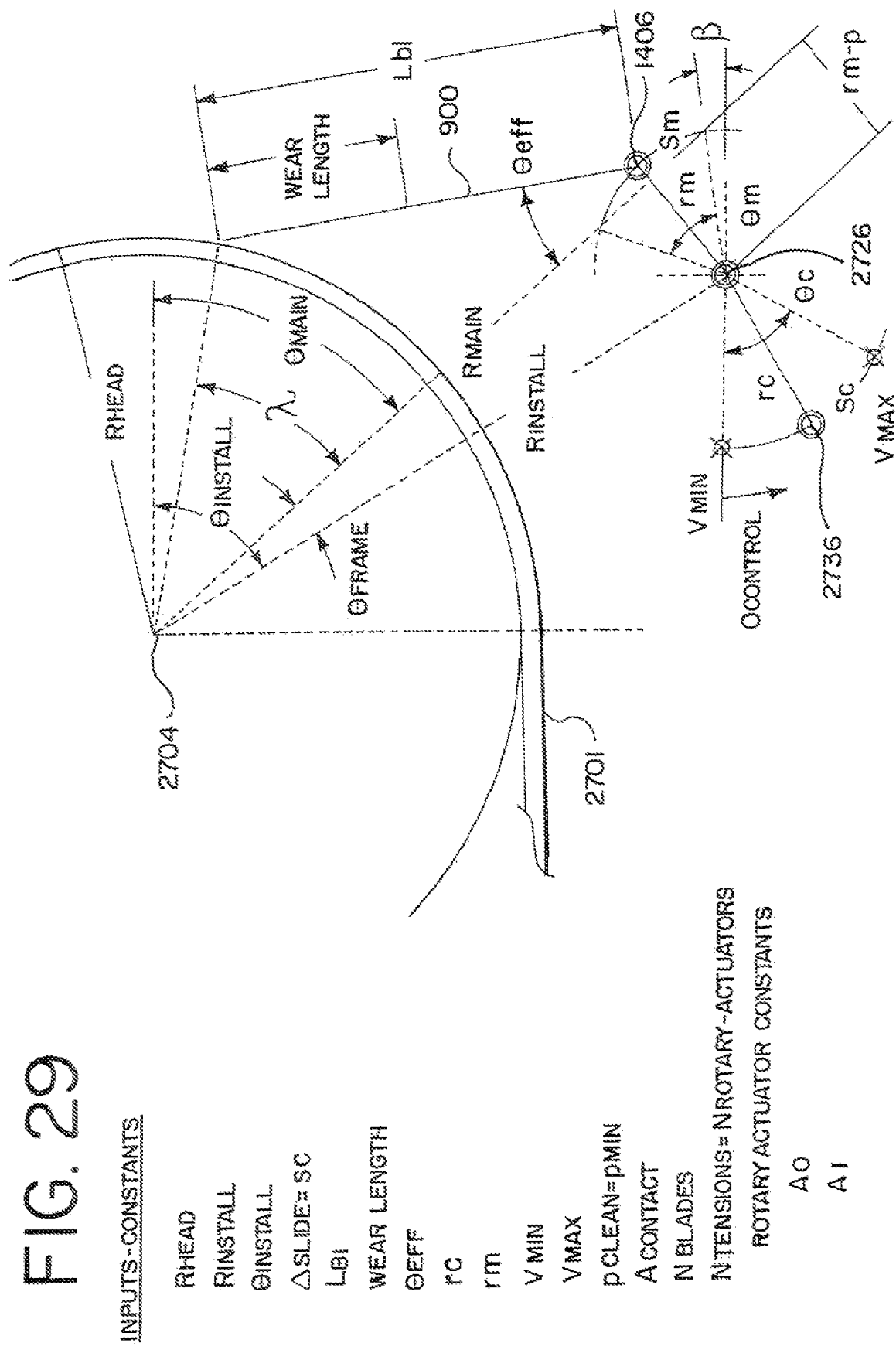
FIG. 29 shows the configuration variables used in establishing initial conditions for the control system of the present invention.
Figure 30:
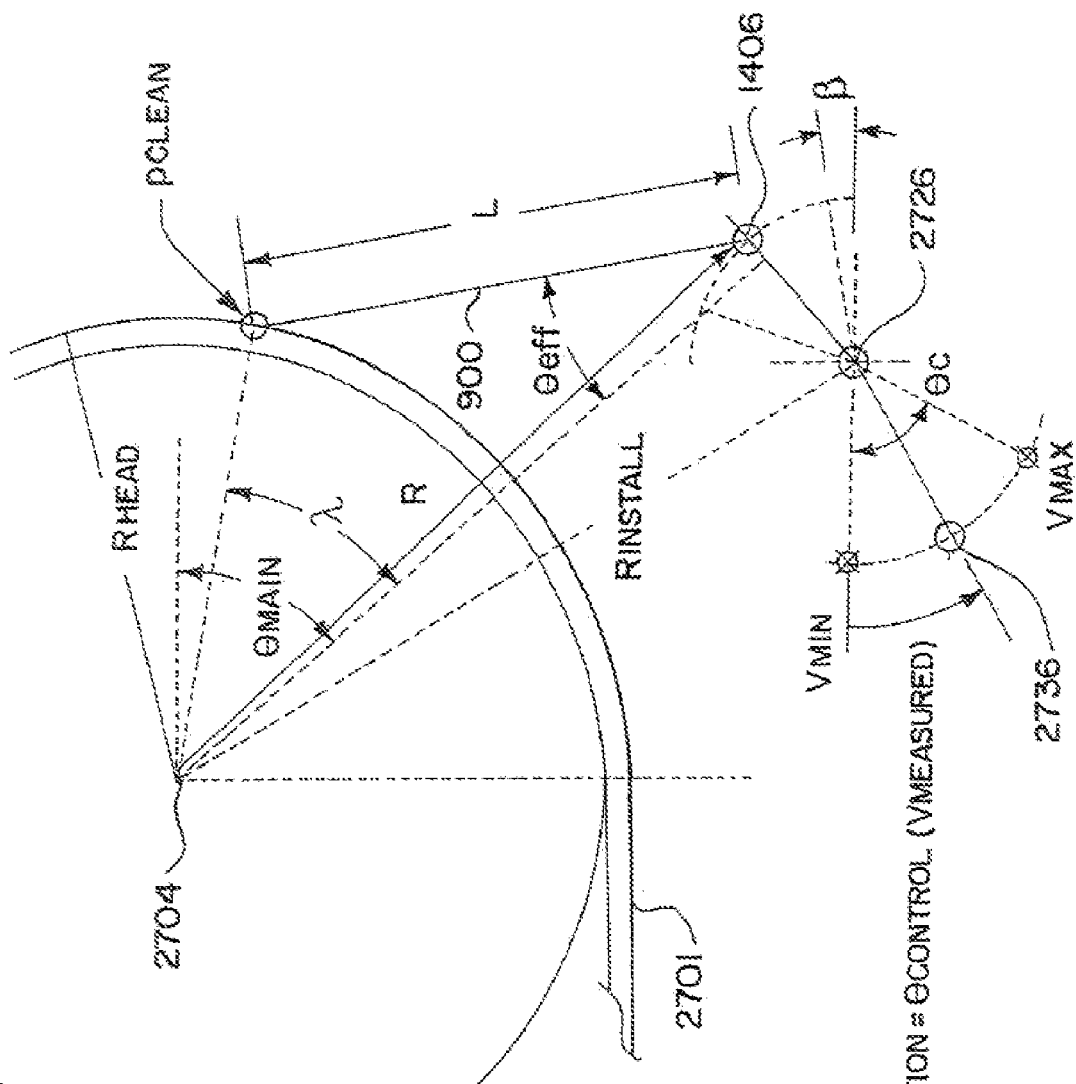
FIG. 30 illustrates control program operational parameters.

FIG. 29 shows the configuration values used in establishing initial conditions for the control system of the present invention prior to actual operation. These parameters are identified in FIG. 29 in a stylized representation of the blade and belt configuration shown in FIGS. 28A-C. FIG. 30 illustrates the control program operational parameters.

The system software automatically calibrates the system and establishes operating parameters, then monitors system operation in real time, making any necessary adjustments of the cleaning blade assemblies required to ensure maximum cleaning effectiveness. Measured values from the system's array of sensors are compared to optimum computed limits, and the system makes adjustments based upon specified rules to try and correct any problem that may have arisen. Indicators associated with the control system advise the end user of any required action.

The system software is stored as a program in a memory device. A processor operative with the memory defines a set of initial conditions that establish the initial radial displacement of the conveyor belt cleaner scraper blade with respect to the conveyor belt. The processor monitors output signals from the sensors, computes the angle of attack of the scraper blade with respect to the conveyor belt and the force with which the scraper blade engages the belt, determines current system performance based upon measured sensor signals, and controls the actuators to adjust scraper blade angle of attack and blade engagement force to optimize current system performance. The software also recognizes what sensors and actuators are present or missing. Thus, different program routines are disabled depending upon the configuration present. For instance, if there is no material sensor present, the "check for material" routine of the programming would be disabled.

Figure 31:
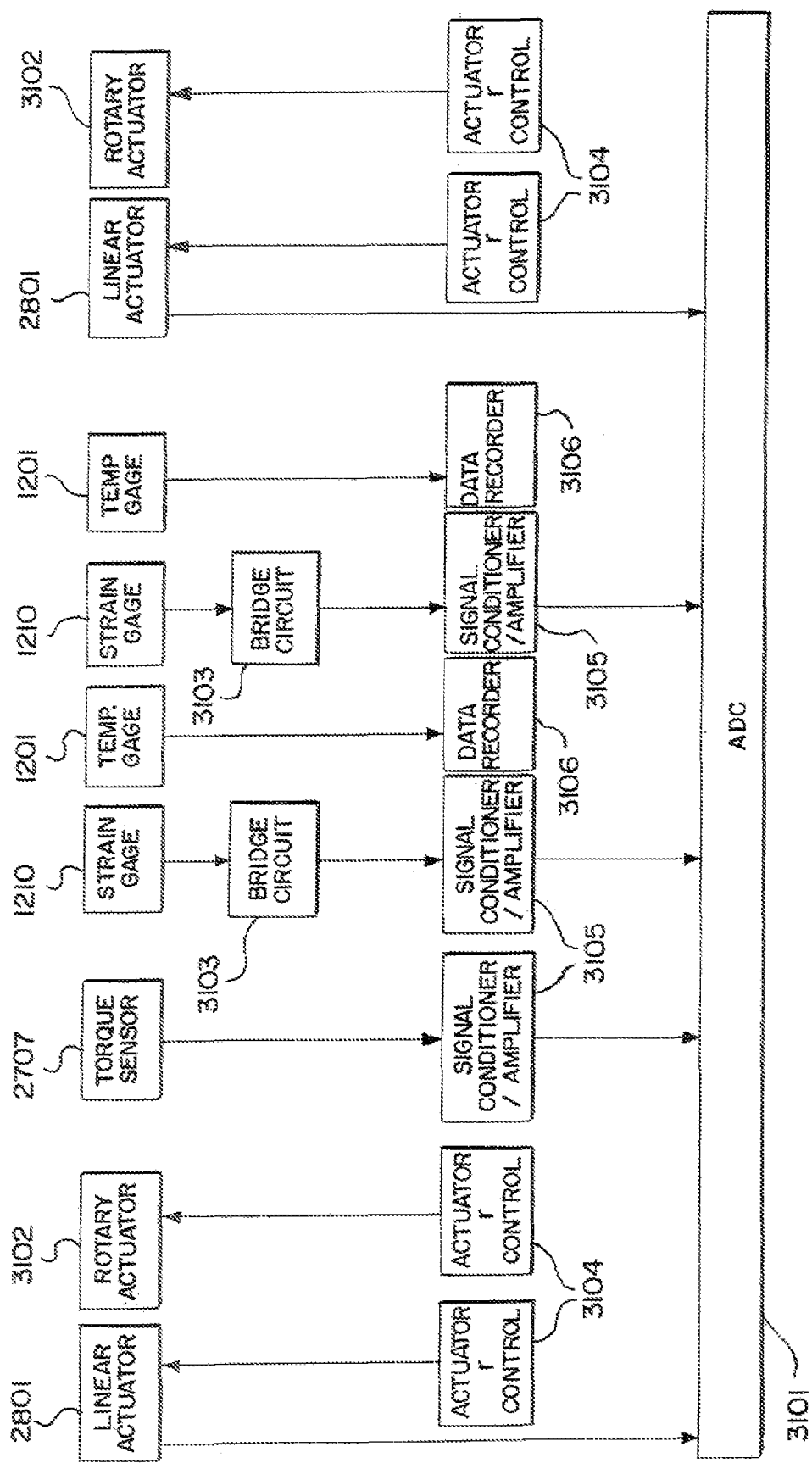
FIG. 31 depicts interconnection of the system sensors with the ADC input channels.

In its preferred form, sensor data is input to a microprocessor-based system that includes a 16 channel, 16-bit analog-to-digital converter (ADC), two serial communication ports, four 8-bit digital-to-analog converters (DACs), two digital input ports, and a digital output port. FIG. 31 illustrates interconnection of the system sensors with the ADC input channels. ADC data is collected for seven channels with 4,000 data points sampled for each channel. This is a total of 28,000 data points. Using two bytes for each sample point, a buffer size of 56 K bytes is required. During the calibration portion of system initialization, measurements are taken as required while the conveyor belt itself is not running. Data is acquired when the conveyor belt is running, and recalibration may be done when the belt is stationary. If the total calibration routine could not be completed, the system uses the values obtained from its last complete calibration.

Figure 32:
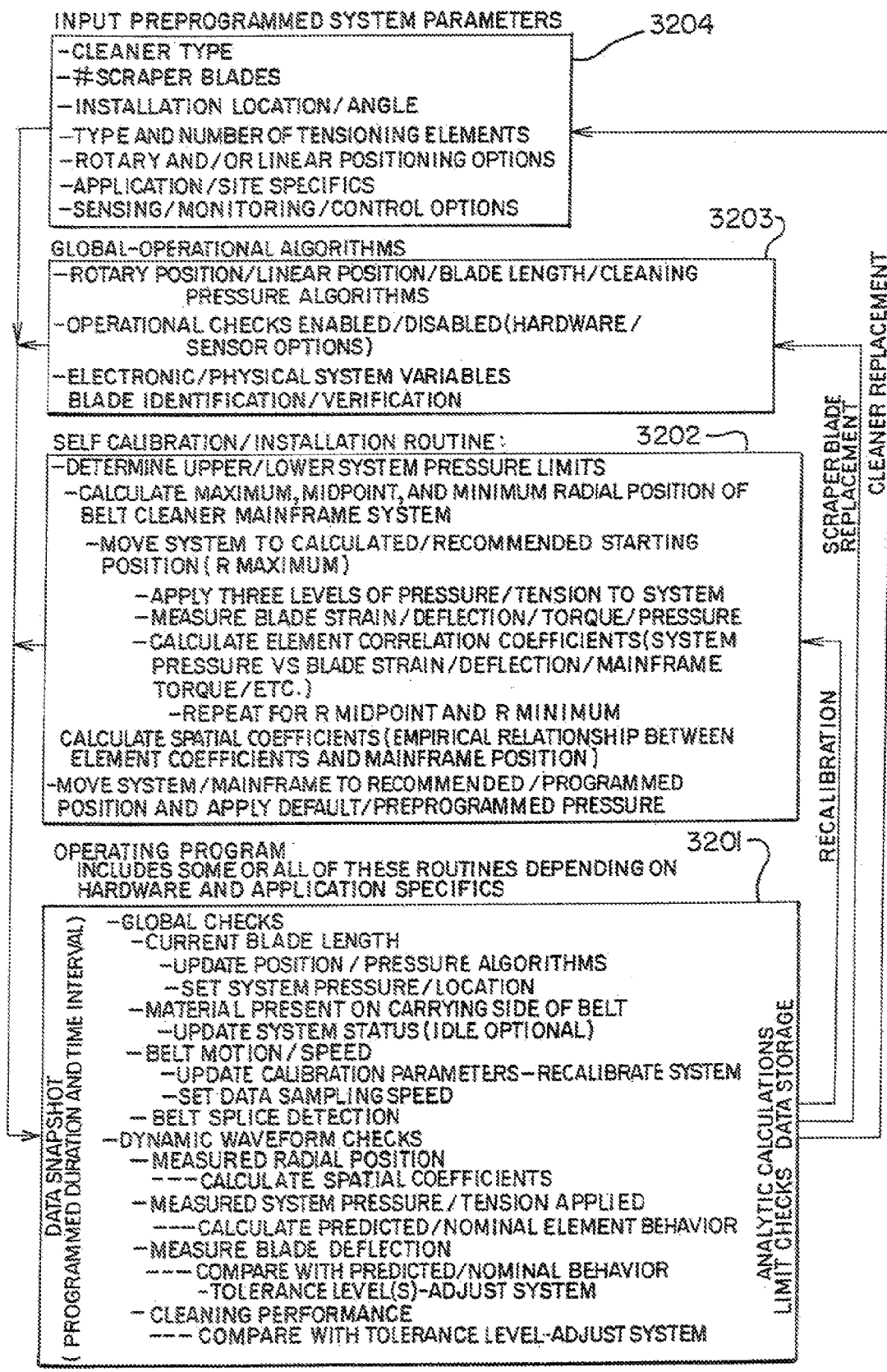
FIG. 32 is a flow chart depicting operation of a computer-controlled belt cleaning system in accordance with the present invention.

A flow chart of program operation is shown in FIG. 32. The Operating Program block 3201 acquires each data snapshot, sampling during a given duration and using a pre-programmed sampling interval. The Operating Program block 3201 is also responsible for time stamping the acquired data block and writing the data block to memory.

After data acquisition, there is a set of Global Checks that are performed. These Global Checks include:

(1) Current blade length. This is determined by the signal from the blade wear sensors. Based upon the current blade length value, the Operating Program 3201 updates the position/pressure algorithms that use blade length from computation, then the Operating Program 3201 may elect to reset the current system pressure/position values to reposition the blade in accordance with the current blade length value.

(2) Material present on carrying side of belt. This information is derived from the output signal of the material present sensor. System status may be updated dependent upon the current reading, changing from Idle to Operational, for example.

(3) Belt motion/speed. This parameter is derived from the measured output of the belt speed sensor. In response to the speed value, calibration parameters may need an update, the system may require re-calibration, and the data sampling speed may need to be updated. At very low belt speeds, for example, the sampling speed may be reduced.

(4) Belt splice detection. The approach of the belt splice is generally indicated by a dedicated sensor, although it is also possible to predict this event by noting a characteristic "signature" appearing within the strain gage data and computing the splice reappearance based upon known belt speed. As the splice passes the blade, it may be necessary to reduce blade engagement pressure, then restore it after the splice passes. This action can help reduce blade wear.

There is also a series of Dynamic—Waveform Checks specified within the Operating Program block 3201. These are as follows:

(5) Measured radial position. Since precise angle of attack of the scraper blade with respect to the belt cannot be measured, this parameter must be computed based upon knowledge of the position of the tensioner (the radial position) acquired through angular and linear displacement sensors disposed on the cross shaft. As noted previously, of course, the exact configuration of the cross shaft may vary from installation to installation (a linear positioning capability may not be needed, for example). This information is known because it is part of the pre-programmed system parameters. Necessary spatial coefficients, including blade angle of attack, are computed from the measured radial position and the measured blade length. One will recognize that these parameters may change during the life of the blade.

(6) Measured system pressure/tension applied. The cross shaft torque provides a direct indication of the amount of engagement force between the blade and the belt, and this torque value can be measured directly from the torque sensor. Based upon system pressure and empirical information, performance of the system can be predicted in terms of blade deflection as indicated by the strain gage sensor output values.

(7) Measured blade deflection. Blade deflection is measured every sampling interval by collecting strain gage output values. These values are compared to the values predicted based upon the known tension applied between the blade and the belt. If the measured values differ significantly from the values predicted by the model, then system adjustment may be required.

(8) Cleaning performance. An indirect indication of cleaning performance is provided either directly by a carry back sensor positioned on the conveyor belt underside, or by analysis of the strain gage sensor outputs. A blade deflection profile that matches up well with empirical data for a given tension value indicates proper performance. If the strain gage values do not match up well with the model, then adjustment is required. Of course, carry back sensor readings and strain gage output profile can be combined to analyze cleaning performance of the system.

Other necessary program segments are called from the Operating Program block 3201. These include the Input—Programmed System Parameters block 3204 that acquires system information necessary to fine-tune the predicted performance model to a specific installation. The parameters acquired in this program block 3204 are generally programmed manually by the system installer or user rather than being detected by reading sensor values.

The information collected by this program module 3204 includes the cleaner type, number of scraper blades installed as well as the blade installation location and angle, and the type and number of tensioning elements. As noted, there are applications in which both linear and angular actuators may not be required, and the program needs to know which are present.

The Input—Programmed System Parameters block 3204 also requires that the user or installer specify any rotary or linear tensioning options. These may include, for example, the specific types of linear and rotary actuators installed on the system, and the specific sensor types that indicate linear and rotary position. There may also be site specifics that impact system operation. These may include the ambient temperature range at the site, for example, as well as the type of material being conveyed. There may also be system options associated with sensing, monitoring, and control, such as type of alarm or action to be taken corresponding to specific blade wear indications.

The Global—Operational Algorithms block 3203 includes the algorithms that permit prediction of system performance based upon measured values, as well as computation of desired system settings. For example, one of the algorithms computes cleaning pressure based upon linear and angular position data combined with current blade length measurement. Another of the routines included in this block acquires the cleaning blade ID provided by the RFID tag (or other identification protocol) and verifies that the blade ID is appropriate. Certain operational checks can also be enabled or disabled based upon hardware and sensor configuration.

The Self-Calibration/Installation Routine 3202 determines upper and lower system pressure limits. This routine accomplishes this task by calculating the minimum, midpoint, and maximum radial positions of the belt cleaner cross shaft (mainframe) system.

The mainframe is then located to its maximum radial position, and three levels of tension are applied to the system in succession. At each tension level, the blade strain and system torque are measured and recorded, and the element correlation coefficients that relate system pressure, blade deflection (strain) and mainframe torque are calculated. This process is repeated both the midpoint and minimum radial positions. The necessary spatial coefficients that determine the empirical relationship between the element coefficients and the mainframe position are then calculated. After these calculations are completed, the mainframe is moved to its pre-programmed initial position and default pressure is applied.

Various features of the invention have been particularly shown and described in connection with the illustrated embodiments of the invention, however, it must be understood that these particular arrangements merely illustrate, and that the invention is to be given its fullest interpretation within the terms of the appended claims.

What is claimed is:

1. A conveyor belt cleaning system for cleaning a conveyor belt, said conveyor belt cleaning system including:
   a conveyor belt cleaner scraper blade adapted to engage the conveyor belt;
   a first actuator coupled to said scraper blade, said first actuator adapted to selectively rotate said scraper blade about a first pivot axis into engagement with the conveyor belt with a selected amount of force; and
   a second actuator coupled to said scraper blade, said second actuator adapted to selectively position said first pivot axis at a desired location with respect to the conveyor belt;
   whereby as said scraper blade wears said first and second actuators are adapted to reposition said scraper blade with respect to the conveyor belt and said first actuator is adapted to adjust the force with which the scraper blade engages the conveyor belt.

2. The conveyor belt cleaner system of claim 1 including a cross shaft, said scraper blade being attached to said cross shaft and said first actuator being coupled to said cross shaft, said first actuator adapted to rotate said cross shaft and said scraper blade about said first pivot axis.

3. The conveyor belt cleaner of claim 1 including a torque sensor adapted to indicate the torsional force with which said first actuator is biasing said scraper blade into engagement with the conveyor belt.

4. The conveyor belt cleaner system of claim 1 including a rotatable bracket, said second actuator being coupled to said bracket and adapted to selectively rotate said bracket about a second pivot axis, said second pivot axis being spaced apart from and generally parallel to said first axis, said scraper blade being coupled to said bracket and being conjointly rotatable with said bracket about said second pivot axis.

5. The conveyor belt leaner system of claim 4 including an angular displacement sensor adapted to indicate the rotational position of said bracket with respect to said second pivot axis.

6. The conveyor belt cleaner system of claim 1 wherein said first actuator comprises a rotary actuator, and said second actuator comprises a linear actuator.

7. A conveyor belt cleaning system that automatically places a conveyor belt cleaner scraper blade in optimum scraping engagement with a conveyor belt, the system comprising:
   means for determining length of a conveyor belt cleaner scraper blade;
   means for computing angle of attack of the conveyor belt cleaner scraper blade with respect to the conveyor belt surface;
   means for measuring strain sensor signals transmitted from the scraper blade; and
   means for positioning the scraper blade at a desired angle of attack and scraping engagement force based upon computed angle of attack and measured strain sensor signals.

8. The conveyor belt cleaning system of claim 7 wherein said means for determining length of a conveyor belt cleaner scraper blade comprises means for deriving scraper blade length from wear sensor signals that define a range of possible length values.

9. The conveyor belt cleaning system of claim 7 wherein said means for computing angle of attack of the conveyor belt cleaner scraper blade with respect to the conveyor belt surface comprises means for establishing the radial distance of the scraper blade pivot axis from the conveyor belt, deriving scraper blade length from wear sensor signals that define a range of possible length values, and computing angle of attack using geometric analysis.

10. The conveyor belt cleaning system of claim 7 wherein said means for measuring strain sensor signals transmitted from the scraper blade comprises means for establishing a sampling duration and a sampling interval, inputting a data snapshot through a multi-channel ADC, time stamping the data snapshot, and storing the data elements of the data snapshot in memory.

11. The conveyor belt cleaning system of claim 7 wherein said means is for positioning said scraper blade comprises means for recalculating blade angle of attack based upon current blade wear sensor data and cross shaft radial displacement data, then repositioning the cross shaft and adjusting engagement force as required.

12. A scraper blade for a conveyor belt cleaner adapted to clean the surface of a conveyor belt, said scraper blade including:
   a base member including one or more cavities; and
   a tip member including a sensor and one or more projecting members, each said projecting member adapted to be removably inserted into a respective cavity of said base member;
   whereby said projecting members removably attach said tip member to said base member.

13. The scraper blade of claim 12 wherein each said projecting member includes a transverse groove, and said base member includes a transverse bore adapted to receive a rod having an eccentric lobe, said rod comprising a locking mechanism that is adapted to selectively rotate said eccentric lobe into engagement with said transverse groove to thereby selectively lock said tip member in engagement with said base member.

14. The scraper blade of claim 12 wherein at least one of said projecting members of said tip member includes one or more electrical contacts and at least one of said cavities of said body includes one or more electrical contacts such that electrical contact is provided between said tip member and said base member when said projecting member is located within said cavity.

15. The scraper blade of claim 12 wherein at least one of said cavities of said base member includes a rib and a groove, and at least one of said projecting members of said tip member includes a rib and a groove, whereby when said projecting member is inserted into said cavity, said rib of said projecting member is located in said groove of said cavity and said rib of said cavity is located in said groove of said projecting member.

16. The scraper blade of claim 15 wherein said sensor comprises a wear rate sensor, said wear rate sensor comprising a plurality of conductive traces disposed upon an electrically insulating substrate, at least a portion of said conductive traces arranged as a plurality of generally concentric loops of decreasing size.

17. A scraper blade for a conveyor belt cleaner adapted to clean the surface of a conveyor belt, said scraper blade including:
   a base member including a body, a projection extending outwardly from said body and a strain gage sensor assembly, said strain gage sensor assembly being located at least partially within said projection of said base member; and
   a tip member adapted to be removably attached to said base member, said tip member including a cavity adapted to receive said projection of said base member when said tip member is attached to said base member;
   whereby said strain gage sensor assembly is adapted to sense flexing of said tip member.

18. The scraper blade of claim 17 wherein said base member includes one or more cavities and said tip member includes one or more projecting members, each said projecting member of said tip member adapted to be removably inserted into a respective cavity in said base member to thereby removably attach said tip member to said base member.

19. The scraper blade of claim 17 wherein said strain gage sensor assembly includes a strain gage sensor disposed between a first plate and a second plate, said first pate being located within said projection of said base member and said second plate being located within said body of said base member.

20. A scraper blade for a conveyor belt cleaner adapted to be removably attached to a cross shaft of the conveyor belt cleaner, said scraper blade including:
   a body having a first end adapted to be attached to the cross shaft and a second end adapted to be placed in engagement with a conveyor belt, and
   an identification tag coupled to said body.

21. The scraper blade of claim 20 including a base member adapted to be attached to the cross shaft, and said body comprises a tip member adapted to be removably attached to said base member and thereby to the cross shaft.

22. The scraper blade of claim 20 wherein said identification tag is embedded within said body of said scraper blade.

23. The scraper blade of claim 20 wherein said identification tag comprises an active RF identification tag that transmits a unique identifying pattern.

* * * * *